United States Patent
Konuma et al.

(10) Patent No.: US 8,930,190 B2
(45) Date of Patent: Jan. 6, 2015

(54) AUDIO PROCESSING DEVICE, AUDIO PROCESSING METHOD, PROGRAM AND INTEGRATED CIRCUIT

(71) Applicant: Panasonic Intellectual Property Corporation Of America, Torrance, CA (US)

(72) Inventors: Tomohiro Konuma, Osaka (JP); Tsutomu Uenoyama, Osaka (JP)

(73) Assignee: Panasonic Intellectual Property Corporation Of America, Torrance, CA (US)

( * ) Notice: Subject to any disclaimer, the term of this patent is extended or adjusted under 35 U.S.C. 154(b) by 0 days.

(21) Appl. No.: 14/113,481

(22) PCT Filed: Mar. 11, 2013

(86) PCT No.: PCT/JP2013/001568
§ 371 (c)(1),
(2) Date: Oct. 23, 2013

(87) PCT Pub. No.: WO2013/157190
PCT Pub. Date: Oct. 24, 2013

(65) Prior Publication Data
US 2014/0043543 A1 Feb. 13, 2014

(30) Foreign Application Priority Data

Apr. 20, 2012 (JP) ................................ 2012-096332

(51) Int. Cl.
| G10L 15/06 | (2013.01) |
|---|---|
| H04N 5/60 | (2006.01) |
| G11B 27/28 | (2006.01) |
| H04N 5/14 | (2006.01) |
| H04N 21/439 | (2011.01) |
| H04N 21/845 | (2011.01) |
| G10L 25/54 | (2013.01) |
| G10L 25/57 | (2013.01) |

(52) U.S. Cl.
CPC .................. *H04N 5/60* (2013.01); *G11B 27/28* (2013.01); *H04N 5/147* (2013.01); *H04N 21/4394* (2013.01); *H04N 21/8456* (2013.01); *G10L 25/54* (2013.01); *G10L 25/57* (2013.01)
USPC ........................... 704/245; 348/722; 348/738

(58) Field of Classification Search
CPC .................................. G10L 15/06; H04N 5/60
USPC .......... 348/738, 722, 723, 180, 700; 704/226, 704/223, 213, 214, 245, 268, 270, 270.1, 704/275, 273, 227, 240, 234, 218, 231, 243, 704/241, 210
See application file for complete search history.

(56) References Cited

U.S. PATENT DOCUMENTS

| 6,710,822 B1 * | 3/2004 | Walker et al. .................. 348/722 |
| 8,200,061 B2 * | 6/2012 | Hirohata et al. ............... 386/241 |

(Continued)

FOREIGN PATENT DOCUMENTS

| JP | 5-20367 | 1/1993 |
| JP | 2001-147697 | 5/2001 |

(Continued)

OTHER PUBLICATIONS

International Search Report issued Apr. 9, 2013 in International (PCT) Application No. PCT/JP2013/001568.

*Primary Examiner* — Trang U Tran
(74) *Attorney, Agent, or Firm* — Wenderoth, Lind & Ponack, L.L.P.

(57) ABSTRACT

An audio processing device including a feature calculation unit, a boundary calculation unit and a judgment unit, detects points of change of audio features from an audio signal in an AV content. The feature calculation unit calculates, for each unit section of the audio signal, section feature data expressing features of the audio signal in the unit section. The boundary calculation unit calculates, for each target unit section among the unit sections of the audio signal, a piece of boundary information relating to at least one boundary of a similarity section. The similarity section consists of consecutive unit sections, inclusive of the target unit section, which each have similar section feature data. The judgment unit calculates a priority of each boundary indicated by one or more of the pieces of boundary information and judges whether the boundary is a scene change point based on the priority.

15 Claims, 26 Drawing Sheets

(56) References Cited

U.S. PATENT DOCUMENTS

| | | | |
|---|---|---|---|
| 8,478,587 B2 * | 7/2013 | Kawamura et al. | 704/226 |
| 8,635,065 B2 * | 1/2014 | Goronzy-Thomae et al. | 704/245 |
| 2010/0169248 A1 | 7/2010 | Iwamoto | |
| 2012/0136823 A1 | 5/2012 | Konuma et al. | |
| 2012/0237042 A1 | 9/2012 | Hirohata et al. | |

FOREIGN PATENT DOCUMENTS

| | | |
|---|---|---|
| JP | 2004-56739 | 2/2004 |
| WO | 2008/143345 | 11/2008 |
| WO | 2011/033597 | 3/2011 |
| WO | 2011/145249 | 11/2011 |

\* cited by examiner

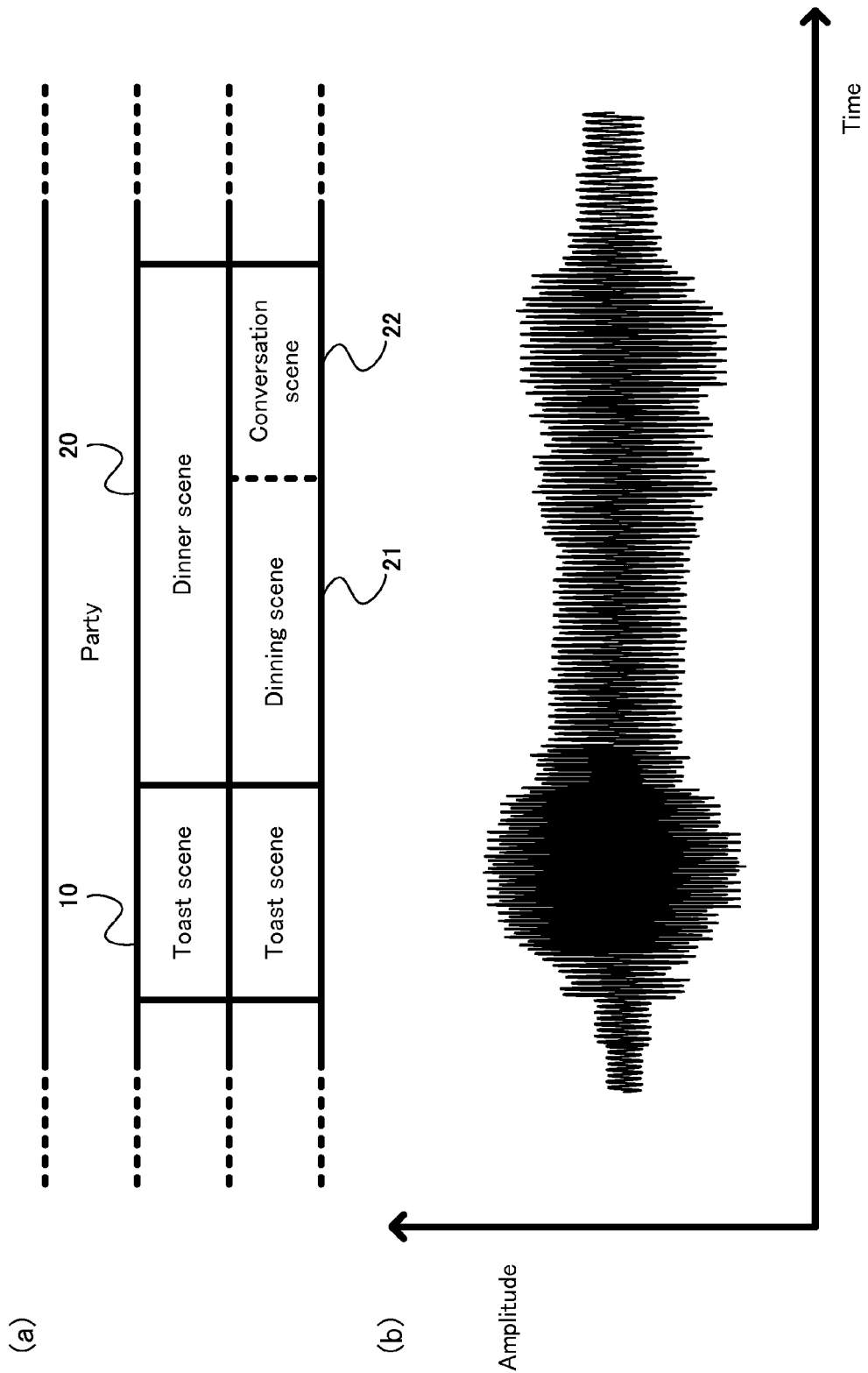

FIG. 3

| First unit section | Feature amount | | | | |
|---|---|---|---|---|---|
| | M(1) | M(2) | M(2) | ... | M(26) |
| 0-10 msec | 0.450 | 0.505 | 0.288 | ... | 0.373 |
| 10-20 msec | 0.489 | 0.502 | 0.314 | ... | 0.419 |
| 20-30 msec | 0.530 | 0.527 | 0.287 | ... | 0.384 |
| ⋮ | ⋮ | ⋮ | ⋮ | ⋮ | ⋮ |
| 500-510 msec | 0.715 | 0.978 | 0.288 | ... | 0.141 |
| ⋮ | ⋮ | ⋮ | ⋮ | ⋮ | ⋮ |
| 990-1000 msec | - | - | - | ... | - |

| Anchor Model | Feature appearance probability function |
|---|---|
| A1 | bA1(M) |
| A2 | bA2(M) |
| A3 | bA3(M) |
| ⋮ | ⋮ |
| A1024 | bA1024(M) |

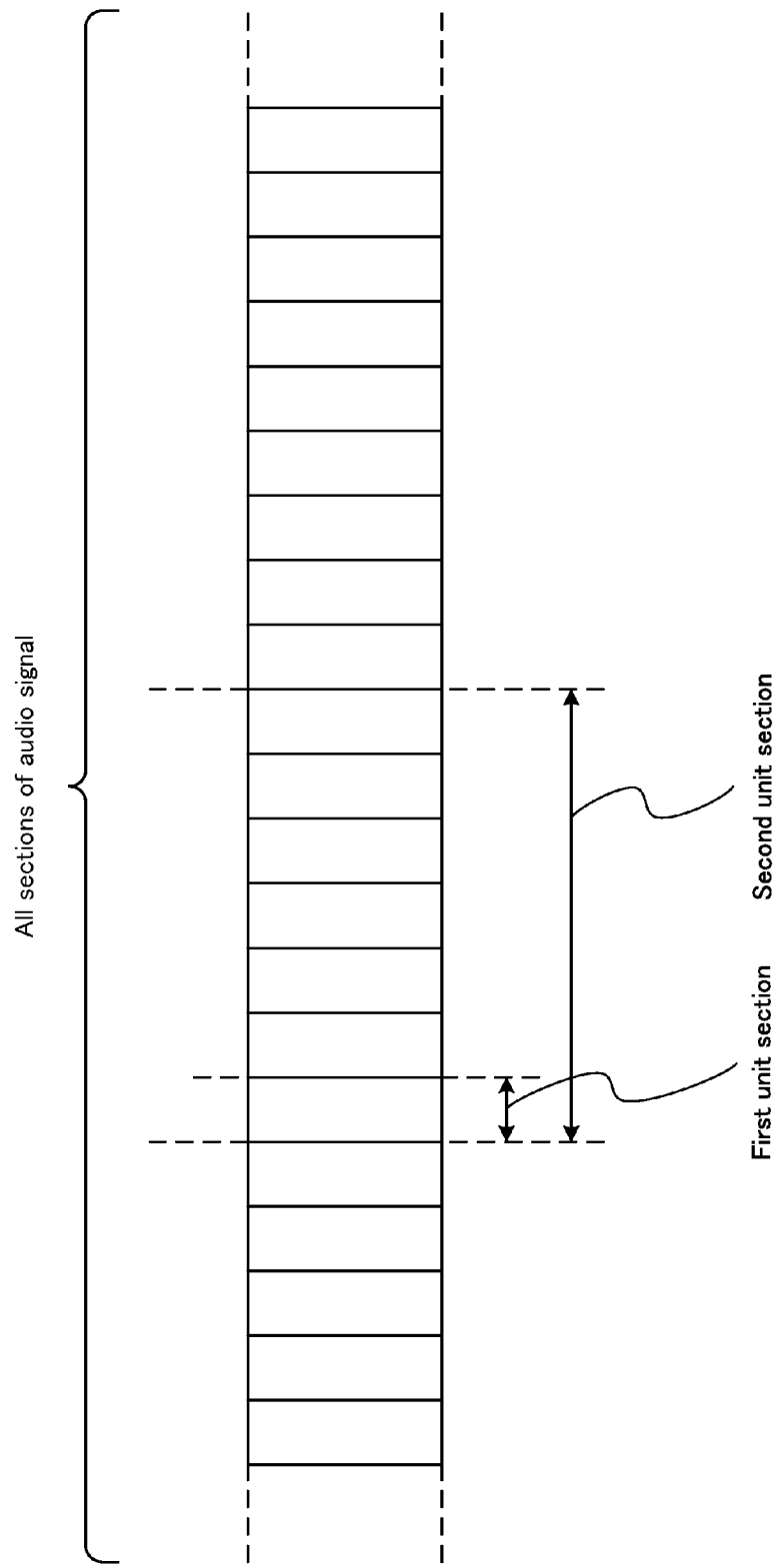

FIG. 8

| Second unit section | Boundary information | |
| --- | --- | --- |
| | Start time | End time |
| 0-1 sec | 0 sec | 10 sec |
| 1-2 sec | 0 sec | 11 sec |
| 2-3 sec | 0 sec | 11 sec |
| 3-4 sec | 1 sec | 11 sec |
| 4-5 sec | 1 sec | 14 sec |
| 5-6 sec | 3 sec | 16 sec |
| ⋮ | ⋮ | ⋮ |
| 50-51 sec | 42 sec | 64 sec |
| ⋮ | ⋮ | ⋮ |

FIG. 22

| Second unit section | Boundary information |||||
|---|---|---|---|---|---|
| | Start time | Start change value | End time | End change value | Audio environment information |
| 0-1 sec | 0 sec | $D_{in}(0)$ | 10 sec | $D_{out}(0)$ | S0 |
| 1-2 sec | 0 sec | $D_{in}(1)$ | 11 sec | $D_{out}(1)$ | S1 |
| 2-3 sec | 0 sec | $D_{in}(2)$ | 11 sec | $D_{out}(2)$ | S2 |
| 3-4 sec | 1 sec | $D_{in}(3)$ | 11 sec | $D_{out}(3)$ | S3 |
| 4-5 sec | 1 sec | $D_{in}(4)$ | 14 sec | $D_{out}(4)$ | S4 |
| 5-6 sec | 3 sec | $D_{in}(5)$ | 16 sec | $D_{out}(5)$ | S5 |
| ⋮ | ⋮ | ⋮ | ⋮ | ⋮ | ⋮ |
| 50-51 sec | 42 sec | $D_{in}(50)$ | 64 sec | $D_{out}(50)$ | S50 |
| ⋮ | ⋮ | ⋮ | ⋮ | ⋮ | ⋮ |

FIG. 24

| Scene change point | Categorization information |
|---|---|
| 0 sec | G1 |
| 11 sec | G1 |
| 42 sec | G2 |
| 71 sec | G2 |
| 92 sec | G2 |
| 117 sec | G3 |
| ⋮ | ⋮ |

AUDIO PROCESSING DEVICE, AUDIO PROCESSING METHOD, PROGRAM AND INTEGRATED CIRCUIT

BACKGROUND OF INVENTION

1. Technical Field

The present invention relates to an art of detecting from an audio signal, a point of change of features of the audio signal such as frequency.

2. Background Art

With regards to an AV content captured by a user using a digital camera or other device, there is demand for a functionality which allows a user to skip scenes which are not required and thus view only scenes which are desired.

Consequently, an art of detecting a point of change between two scenes (referred to below as a scene change point) using audio information in the AV content, such as sound pressure and frequency, is attracting attention.

For example, a method of detecting a scene change point has been proposed in which audio information is quantified as a feature amount for each frame of an AV content, and a scene change point is detected when a change in the feature amount between frames exceeds a threshold value (refer to Patent Literature 1).

CITATION LIST

Patent Literature

[Patent Literature 1] Japanese Patent Application Publication No. H05-20367

SUMMARY OF INVENTION

Depending on a user's interests, an AV content captured by the user may include a wide variety of different subject matter. Consequently, detection of a wide variety of different scene change points is necessary. Comprehensive detection of the wide variety of different scene change points using a single specific method is complicated. As a result, some scene change points are difficult to detect even when using the conventional method described above.

In consideration of the above, the present invention aims to provide an audio processing device capable of detecting scene change points which are difficult to detect using a conventional method.

In order to solve the above problem, an audio processing device relating to the present invention comprises: a feature calculation unit configured to calculate, for each of a plurality of unit sections of an audio signal, section feature data expressing features of the audio signal in the unit section; a boundary calculation unit configured to calculate, for each of a plurality of target unit sections among the unit sections of the audio signal, a piece of boundary information relating to at least one boundary between a similarity section and another section of the audio signal, the similarity section consisting of a plurality of consecutive unit sections, inclusive of the target unit section, which each have similar section feature data; and a judgment unit configured to calculate a priority of each boundary that is indicated by one or more of the pieces of boundary information and judge whether the boundary is a scene change point based on the priority of the boundary.

Through the audio processing device relating to the present invention, scene change points can be detected by setting a similarity section with regards to each of a plurality of target unit sections, and detecting a boundary of the similarity section as a scene change point.

BRIEF DESCRIPTION OF DRAWINGS

FIG. 1 illustrates a specific example of scenes and an audio signal which configure an AV content.

FIG. 3 illustrates an example of the feature vectors.

FIG. 4 illustrates an example of Anchor Models.

FIG. 6 illustrates a relationship between a first unit section and a second unit section.

FIG. 8 illustrates an example of boundary information calculated by a boundary information calculation unit.

FIG. 22 illustrates an example of boundary information calculated by a boundary information calculation unit.

FIG. 24 illustrates an example of index information generated by the index generation unit.

DETAILED DESCRIPTION OF INVENTION

<Background Leading to Present Invention>

Figure 2A:
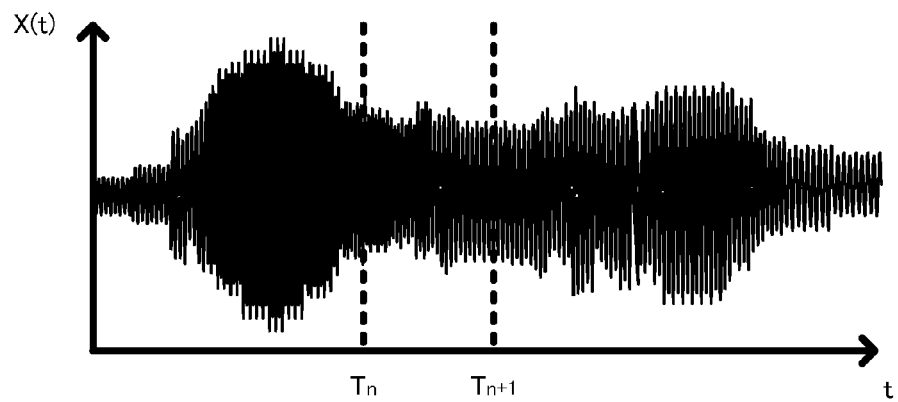
FIGS. 2A-2C illustrate a method for calculating feature vectors.

An AV content is configured by sections of various lengths, dependent on a degree of definition used when determining scenes therein. For example, the AV content may be a content which is captured at a party, and may be configured by scenes illustrated in section (a) of FIG. 1. Section (b) of FIG. 1 illustrates an audio signal corresponding to the scenes illustrated in section (a). As illustrated in FIG. 1, the party includes a toast scene 10 and subsequently a dinner scene 20. The dinner scene 20 consists of a dining scene 21, in which a main action is eating, and a conversation scene 21, in which a main action is talking. The dinner scene 20 is a transition scene in which there is transition from the dining scene 21 in which the main action is eating, to the conversation scene 22 in which the main action is talking.

In a transition scene such as described above, changes in audio information are gradual. Therefore, detection of a point of change in the transition scene is difficult when using the conventional method which uses a change value of audio information between frames.

For a section of a certain length in a transition scene such as described above, a change value of audio information between opposite ends of the section is a cumulative value of change values in the section, thus the opposite ends of the section can be detected to belong to different sub-scenes included in the transition scene. In consideration of the above, the present inventors discovered that a point of change within a transition scene can be detected as a boundary between a section in which audio information is similar (a similarity section) and another section in the transition scene. For example, a point of change can be detected as a boundary between a similarity section in a first half of the transition scene and a similarity section in a second half of the transition scene.

A similarity section can be determined in an audio signal by comparing audio information at a reference position to audio information either side of the reference position. Consequently, a similarity section can be determined in a transition scene by designating one point in the transition scene as a reference position.

However, in order to find a similarity section in a transition scene of which a position in the audio signal is not known in advance, a large number of positions within the audio signal must each be set as a reference position. The larger the number of different reference positions which are set, the larger the number of boundaries (points of change) which are detected.

If the number of points of change which are detected is large compared to the number of scenes desired by a user, operations required by the user before a desired scene can be viewed become burdensome. In other words, the user is required to search for a point of change corresponding to a start point of a desired scene from among a large number of points of change. Therefore, an increased number of points of change may lead to a disadvantageous effect of the user being unable to easily view a desired scene.

In one method considered to solve the above problem, points of change to be indexed are selected from among points of change which are detected, in order to restrict the number of points of change which are indexed.

The inventors achieved the present invention in light of the background described above. The following explains embodiments of the present invention with reference to the drawings.

First Embodiment 1-1. Overview

The following is an overview explanation of an audio processing device relating to a first embodiment of the present invention.

With respect to an audio signal included in a video file which is partitioned into unit sections of predetermined length, the audio processing device relating to the present embodiment first calculates, for each of the unit sections, a feature amount expressing features of the audio signal in the unit section.

Next, based on degrees of similarity between the feature amounts which are calculated, the audio processing device calculates, for each of the unit sections, one or more boundaries between a section which is similar to the unit section and other sections of the audio signal.

Subsequently, the audio processing device calculates a boundary grading of each of the boundaries which is calculated, and detects scene change points from among the boundaries based on the boundary gradings.

Finally, the audio processing device outputs the scene change points which are detected as index information.

In the present embodiment, a boundary grading refers to a number of boundaries indicated at a same time. In the audio processing device relating to the present embodiment, detection of a point of change between a scene desired by a user and another scene can be prioritized based on an assumption that for a scene desired by the user, boundaries indicated at a same time are calculated from unit sections included in the scene desired by the user.

1-2. Data

The following describes data used by the audio processing device relating to the present embodiment.
<Video File>

A video file is configured by an audio signal X(t) and a plurality of pieces of image data. The audio signal X(t) is time series data of amplitude values and can be represented by a waveform such as illustrated in FIG. 2A. FIG. 2A is an example of a waveform of an audio signal in which amplitude is plotted on a vertical axis against time on a horizontal axis.
<Feature Vectors>

Feature vectors M express features of the audio signal X(t). In the present embodiment, the audio signal is partitioned into first unit sections and Mel-Frequency Cepstrum Coefficients (MFCC) for each of the first unit sections are used for the feature vectors M. Each first unit section is a section of a predetermined length (for example 10 msec) along a time axis of the audio signal X(t). For example, in FIG. 2A a section from a time $T_n$ to a time $T_{n+1}$ is one first unit section.

A feature vector M is calculated for each first unit section. Consequently, as illustrated in FIG. 3, 100 feature vectors M are generated for a section between a time of 0 sec and a time of 1 sec in the audio signal. FIG. 3 illustrates an example of feature vectors M calculated for first unit sections between the time of 0 sec and the time of 1 sec.
<Anchor Models>

Anchor Models $A_r$ (r=1, 2, ..., K) are probability models created using feature vectors generated from audio data including a plurality of sound pieces of various types. The Anchor Models express features of each of the types of sound pieces. In other words, Anchor Models are created which correspond one-to-one to the types of sound pieces. In the present embodiment a Gaussian Mixture Model (GMM) is adopted and each Anchor Model is configured by parameters defining a normal distribution.

As illustrated in FIG. 4, an Anchor Model is created for each of the sound pieces of various types (1024 types in the present embodiment). The Anchor Models are each expressed as a feature amount appearance probability function $b_{A_r}(M)$ of a corresponding type of sound piece. The feature amount appearance probability function $b_{A_r}(M)$ is a probability density function of the normal distribution defined by each Anchor Model $A_r$, and through setting the feature vector M as an argument, a likelihood $L_r = b_{A_r}(M)$ is calculated for the audio signal $X(t)$ with regards to each of the sound pieces.

<Likelihood Vectors>

A likelihood vector F is a vector having as components thereof, the likelihoods $L_r$ calculated for the audio signal $X(t)$ with regards to the sound pieces of various types using the Anchor Models $A_r$ as described above.

Figure 5A:
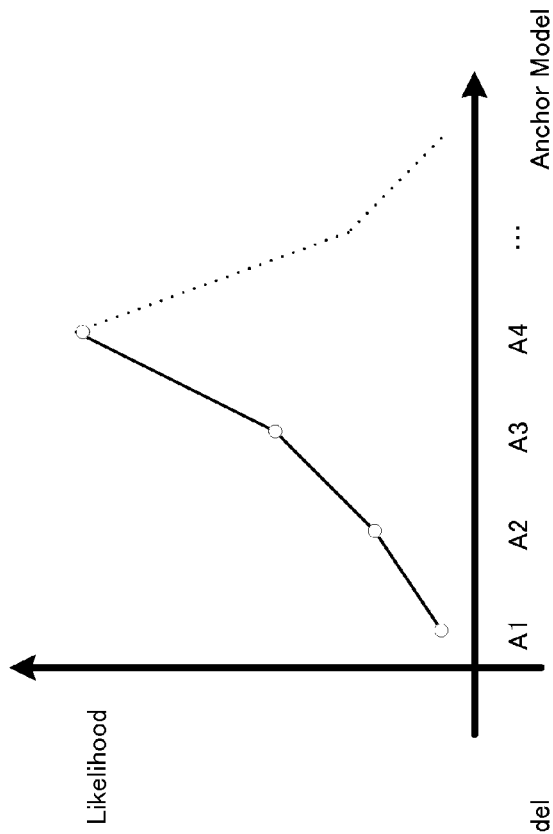
FIGS. 5A and 5B illustrate examples of likelihood vectors in two first unit sections.
Figure 5B:
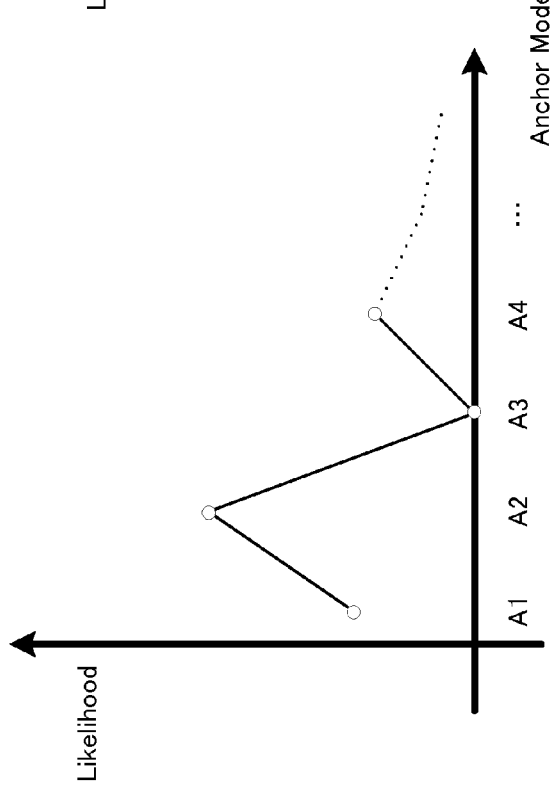

FIGS. 5A and 5B illustrate likelihood vectors F in two different first unit sections. FIG. 5A may for example illustrate a likelihood vector $F_n$ in an $n^{th}$ first unit section from a time 0, in other words for a section between a time 10(n) msec and a time 10(n+1) msec, and FIG. 5B may for example illustrate a likelihood vector $F_m$ in an $m^{th}$ first unit section (n<m) from the time 0, in other words for a section between a time 10(m) msec and a time 10(m+1) msec.

<Frequency Vectors>

Frequency vectors NF are vectors expressing features of the audio signal for each second unit section. Specifically, each of the frequency vectors NF is a vector which expresses an appearance frequency of each sound piece with regards to a second unit section of the audio signal. Each second unit section is a section of predetermined length (for example 1 sec) along the time axis of the audio signal $X(t)$. As illustrated in FIG. 6, each second unit section is equivalent in length to a plurality of consecutive first unit sections.

Figure 7:
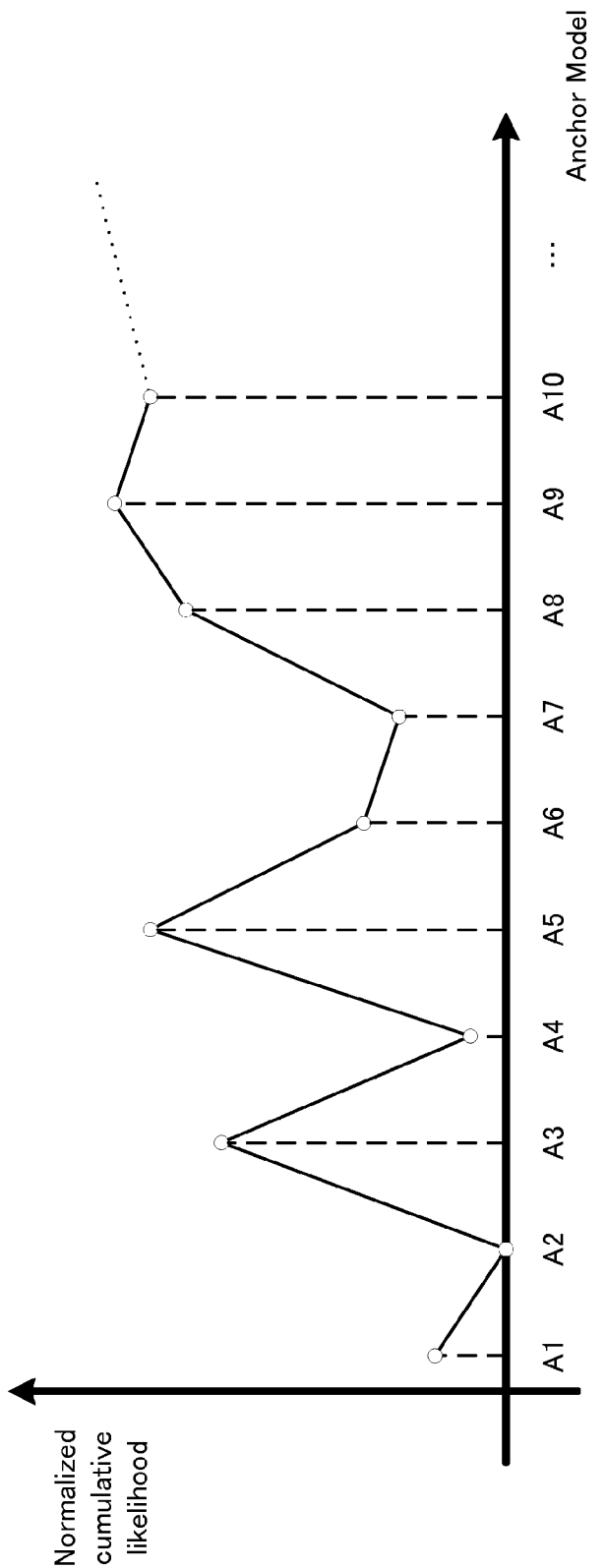
FIG. 7 illustrates an example of a frequency vector.

More specifically, the frequency vector NF is a normalized cumulative likelihood of likelihood vectors F in the second unit section. In other words the frequency vector NF is obtained by normalizing cumulative values of components of the likelihood vectors F in the second unit section. Herein, normalization refers to setting a norm of the frequency vector NF as 1. FIG. 7 is a schematic diagram illustrating an example of a frequency vector NF.

<Boundary Information>

A piece of boundary information is calculated for each second unit section of the audio signal. The piece of boundary information relates to boundaries of a similarity section in which frequency vectors are similar to a frequency vector of the second unit section. In the present embodiment, each piece of boundary information calculated by the audio processing device includes a start time and an end time of the similarity section to which the piece of boundary information relates. FIG. 8 illustrates an example of boundary information calculated in the present embodiment. For example, FIG. 8 illustrates that for an initial second unit section (a section from time 0 sec to time 1 sec) a start time of 0 sec and an end time of 10 sec are calculated as a piece of boundary information.

<Boundary Grading>

Figure 9:
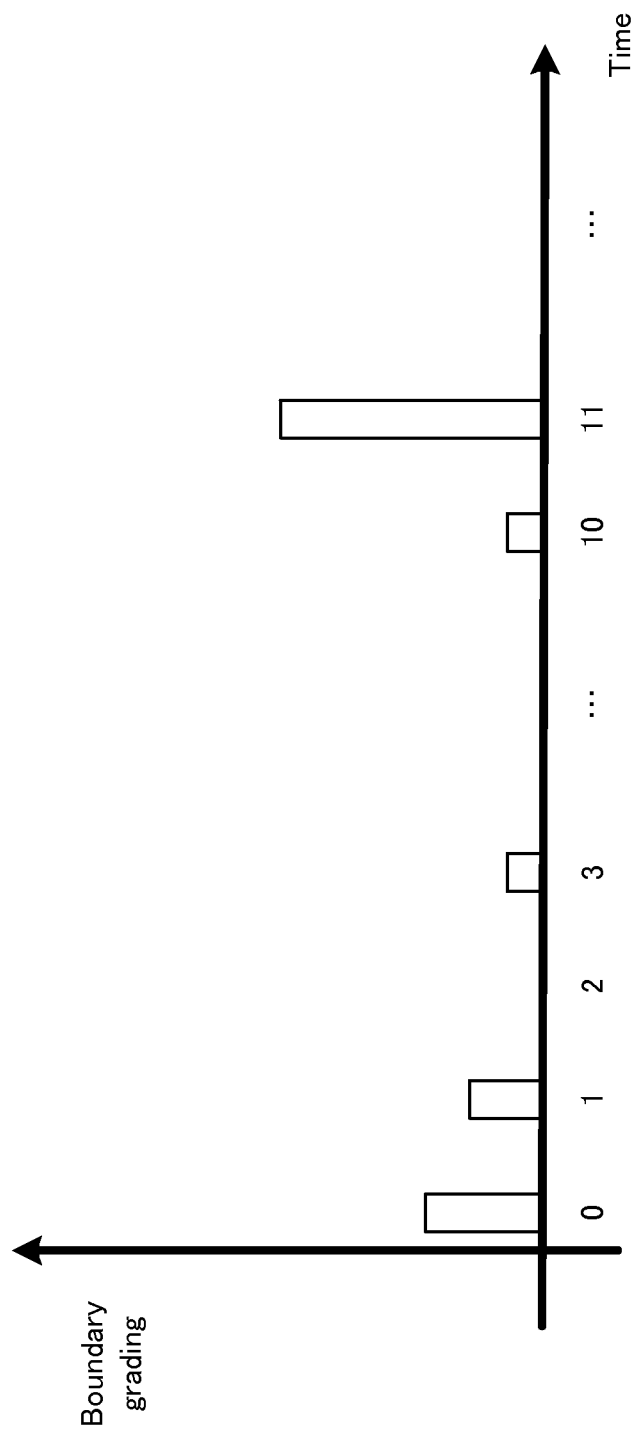
FIG. 9 is a graph illustrating boundary grading on a vertical axis plotted against time on a horizontal axis.

As explained above, a boundary grading refers to a number of pieces of boundary information indicating a same time. For example, in FIG. 8 pieces of boundary information calculated for the initial second unit section (section from time 0 sec to time 1 sec), a $1^{st}$ second unit section (section from time 1 sec to time 2 sec) and a $2^{nd}$ second unit section (section from time 2 sec to time 3 sec) each indicate time 0 sec as either a start time or an end time. Time 0 sec is indicated by three pieces of boundary information, and therefore time 0 sec has a boundary grading of three. FIG. 9 is a graph illustrating an example of boundary gradings which are calculated plotted on the vertical axis against time on the horizontal axis.

1-3. Configuration

The following explains functional configuration of a video viewing apparatus 100 which is provided with an audio processing device 104 relating to the present embodiment.

<Video Viewing Apparatus 100>

Figure 10:
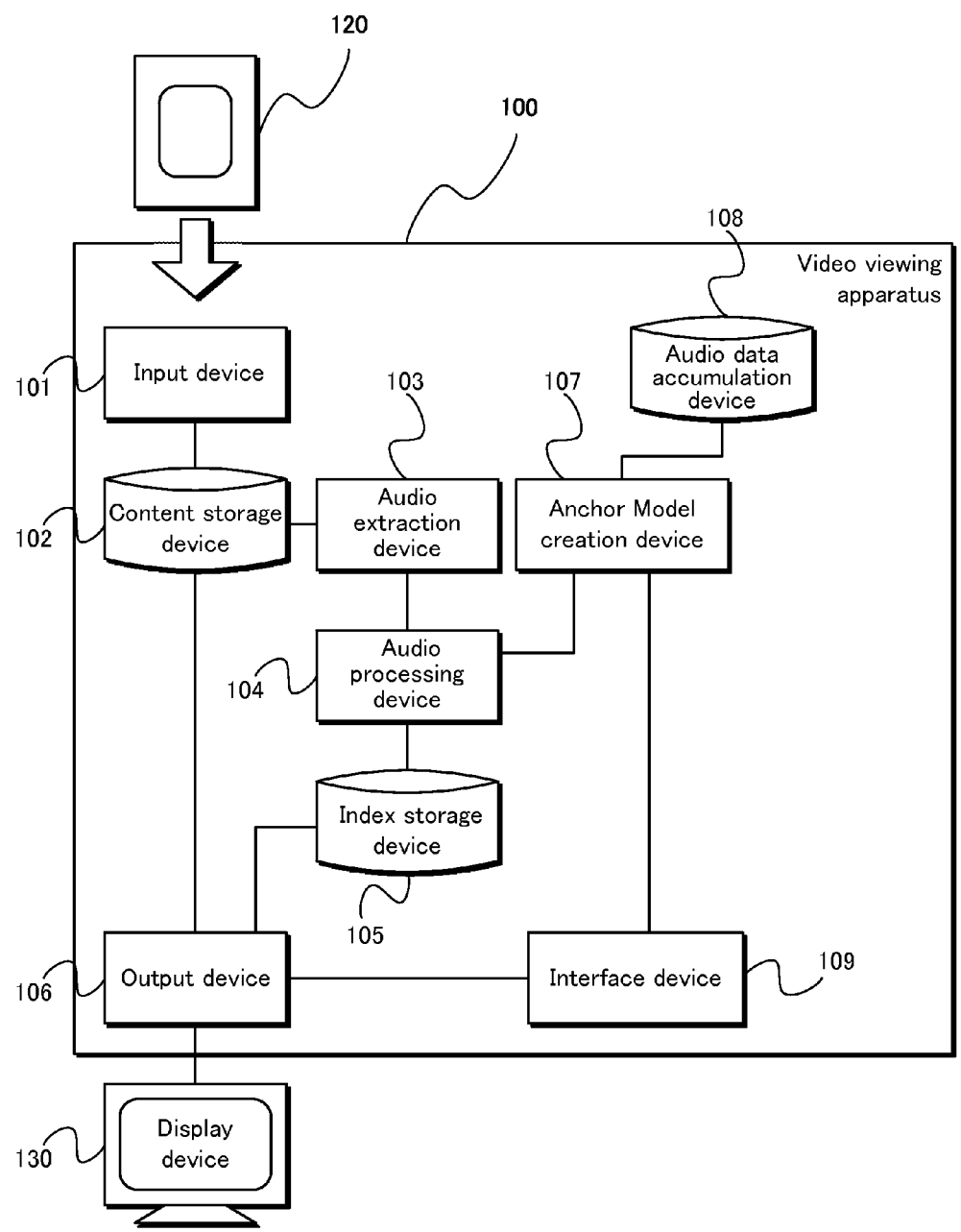
FIG. 10 is a block diagram illustrating an example of functional configuration of a video viewing apparatus provided with an audio processing device.

FIG. 10 is a block diagram illustrating an example of functional configuration of the video viewing apparatus 100. As illustrated in FIG. 10, the video viewing apparatus 100 includes an input device 101, a content storage device 102, an audio extraction device 103, the audio processing device 104, an index storage device 105, an output device 106, an Anchor Model creation device 107, an audio data accumulation device 108 and an interface device 109.

<Input Device 101>

The input device 101 is configured by a disk drive or the like. When a recording medium 120 is loaded into the input device 101, the input device 101 acquires a video file by reading the video file from the recording medium 120, and subsequently stores the video file in the content storage device 102. The recording medium 120 is a medium capable of storing various types of data thereon, such as an optical disk, a floppy disk, an SD card or a flash memory.

<Content Storage Device 102>

The content storage device 102 is configured by a hard disk or the like. The content storage device 102 stores therein the video file acquired from the recording medium 120 by the input device 101. Each video file stored in the content storage device 102 is stored with a unique ID attached thereto.

<Audio Extraction Device 103>

The audio extraction device 103 extracts an audio signal from the video file stored in the content storage device 102 and subsequently inputs the audio signal into the audio processing device 104. The audio extraction device 103 performs decoding processing on an encoded audio signal, thus generating an audio signal $X(t)$ such as illustrated in FIG. 2A. The audio extraction device 103 may for example be configured by a processor which executes a program.

<Audio Processing Device 104>

The audio processing device 104 performs detection of one or more scene change points based on the audio signal $X(t)$ input from the audio extraction device 103. The audio processing device 104 stores index information in the index storage device 105, indicating the scene change point which is detected. Functional configuration of the audio processing device 104 is explained in detail further below.

<Index Storage Device 105>

The index storage device 105 is configured by a hard disk or the like. The index storage device 105 stores therein, the index information input from the audio processing device 104. The index information includes an ID of the video file and a time (time of the scene change point) in the video file.

<Output Device 106>

The output device 106 acquires the index information from the index storage device 105 and outputs a piece of image data (part of the video file stored in the content storage device 102) corresponding to the index information to a display device 130. The output device 106 may for example attach UI (User Interface) information to the image data to be output to the display device 130, such as a progress bar marked at a time corresponding to the index information. The output device 106 performs play control, such as skipping, in accordance with an operation input into the interface device 109 by a user.

The output device 106 may for example be configured by a processor which executes a program.

<Anchor Model Creation Device 107>

The Anchor Model creation device 107 creates Anchor Models $A_r$ based on audio signals stored in the audio data accumulation device 108. The Anchor Model creation device 107 outputs the Anchor Models $A_r$ to the audio processing device 104. Functional configuration of the Anchor Model creation device 107 is explained in detail further below.

The audio signals used by the Anchor Model creation device 107 in creation of the Anchor Models $A_r$ are audio signals acquired in advance by extraction from a plurality of video files, which are not the video file which is targeted for detection of the scene change point.

<Audio Data Accumulation Device 108>

The audio data accumulation device 108 is configured by a hard disk or the like. The audio data accumulation device 108 stores therein in advance, audio data which is used in creation of the Anchor Models $A_r$ by the Anchor Model creation device 107.

<Interface Device 109>

The interface device 109 is provided with an operation unit (not illustrated) such as a keyboard or the like. The interface device 109 receives an input operation from a user and notifies the output device 106 of operation information, for example relating to a progress bar. The interface device 109 also notifies the Anchor Model creation device 107 of a number K of Anchor Models to be created.

<Audio Processing Device 104 (Detailed Explanation)>

The audio processing device 104 is configured by a memory (not illustrated) and one or more processors (not illustrated). The audio processing device 104 implements a configuration illustrated in FIG. 11 through execution by the processor of a program written in the memory.

Figure 11:
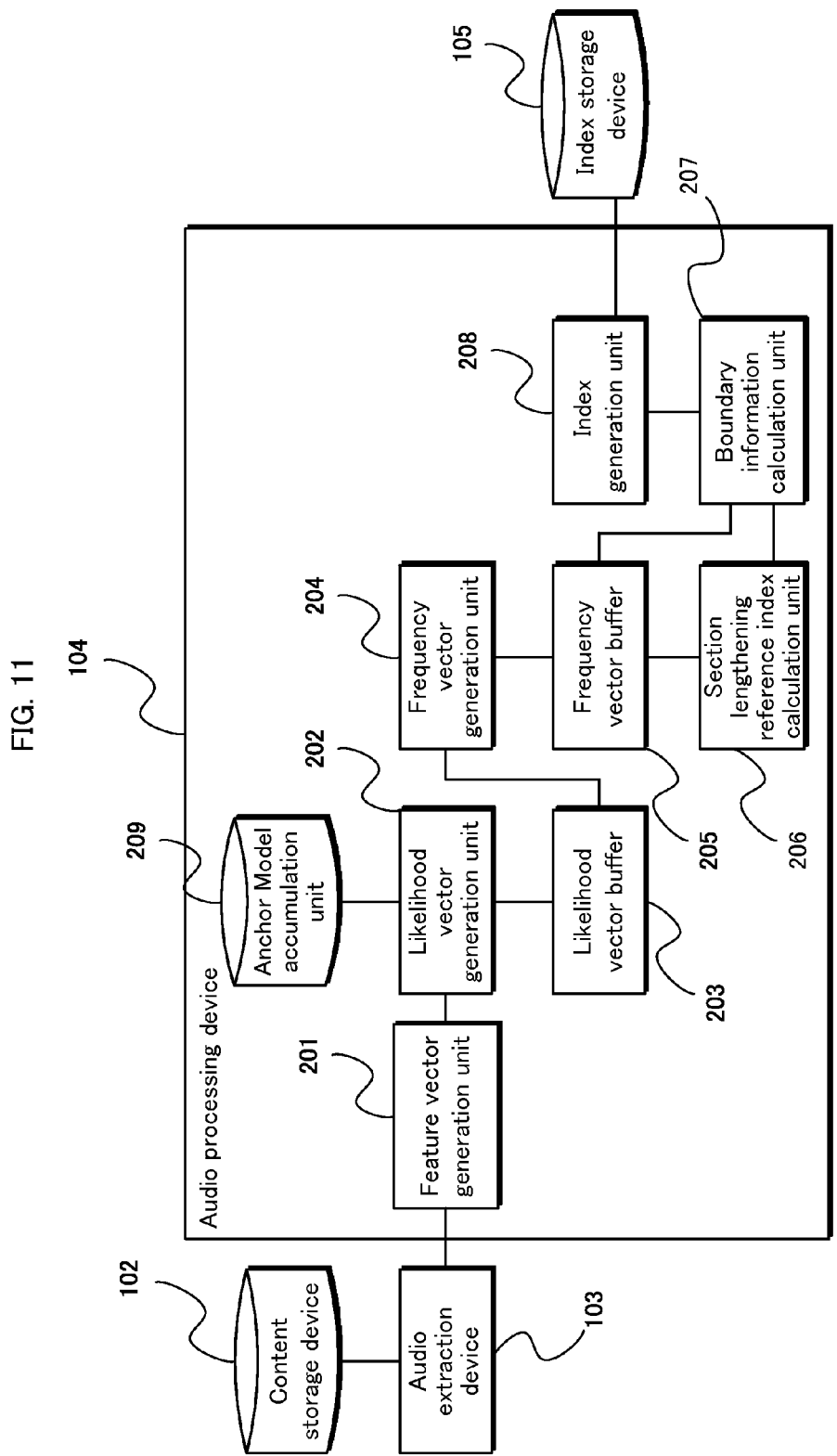
FIG. 11 is a block diagram illustrating an example of functional configuration of the audio processing device.

FIG. 11 is a block diagram illustrating an example of functional configuration of the audio processing device 104. As illustrated in FIG. 11, the audio processing device 104 includes a feature vector generation unit 201, a likelihood vector generation unit 202, a likelihood vector buffer 203, a frequency vector generation unit 204, a frequency vector buffer 205, a section lengthening reference index calculation unit 206, a boundary information calculation unit 207, an index generation unit 208 and an Anchor Model accumulation unit 209. The following explains configuration of each of the above elements.

<Feature Vector Generation Unit 201>

The feature vector generation unit 201 generates a feature vector M for each first unit section based on the audio signal X(t) input from the audio extraction device 103.

The following is an overview of generation of the feature vector M based on the audio signal X(t).

Figure 2B:
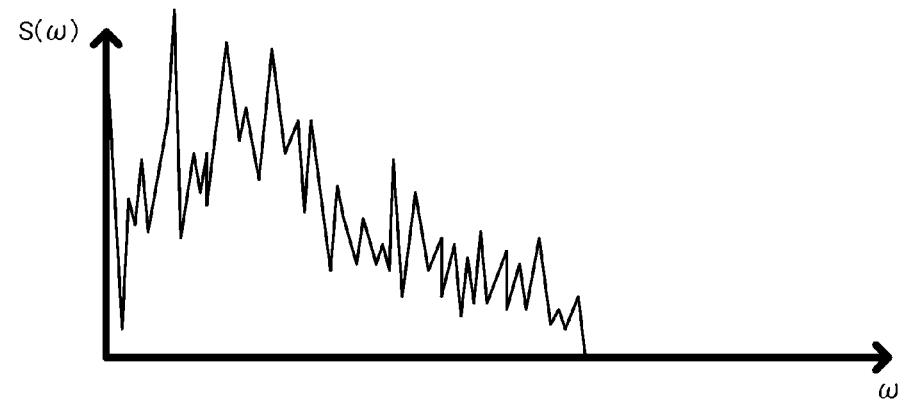

Firstly, the feature vector generation unit 201 calculates a power spectrum $S(\omega)$ of the audio signal X(t) in the first unit section (refer to FIG. 2B). The power spectrum $S(\omega)$ is calculated by converting the time axis of the audio signal X(t) to a frequency axis and by squaring each frequency component.

Figure 2C:
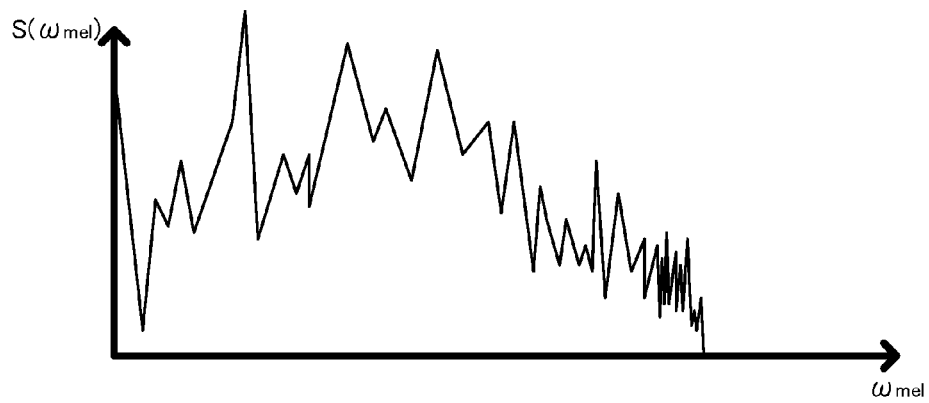

Next, the feature vector generation unit 201 calculates a mel-frequency spectrum $S(\omega_{mel})$ by converting the frequency axis of the power spectrum $S(\omega)$ to a mel-frequency axis (refer to FIG. 2C).

Finally, the feature vector generation unit 201 calculates a mel-frequency cepstrum from the mel-frequency spectrum $S(\omega_{mel})$ and sets a predetermined number of components (26 in the present embodiment) as the feature vector M.

<Anchor Model Accumulation Unit 209>

The Anchor Model accumulation unit 209 is configured as a region in the memory and stores therein the Anchor Models $A_r$ created by the Anchor Model creation device 107. In the present embodiment the Anchor Model accumulation unit 209 stores the Anchor Models $A_r$ in advance of execution of processing by the audio processing device 104.

<Likelihood Vector Generation Unit 202>

The likelihood vector generation unit 202 generates a likelihood vector F for each first unit section. The likelihood generation unit 202 uses a corresponding feature vector M generated by the feature vector generation unit 201 and the Anchor Models $A_r$ accumulated in the Anchor Model accumulation unit 209 to calculate a likelihood $L_r$ for the audio signal X(t) with regards to each sound piece. The likelihood generation unit 202 sets the likelihoods $L_r$ as components of the likelihood vector F.

<Likelihood Vector Buffer 203>

The likelihood vector buffer 203 is configured as a region in the memory. The likelihood vector buffer 203 stores therein the likelihood vectors F generated by the likelihood vector generation unit 202.

<Frequency Vector Generation Unit 204>

The frequency vector generation unit 204 generates a frequency vector NF for each second unit section based on the likelihood vectors F stored in the likelihood vector buffer 203.

<Frequency Vector Buffer 205>

The frequency vector buffer 205 is configured as a region in the memory. The frequency vector buffer 205 stores therein the frequency vectors NF generated by the frequency vector generation unit 204.

<Section Lengthening Reference Index Calculation Unit 206>

The section lengthening reference index calculation unit 206 calculates a reference section, a reference vector S and a threshold value Rth with regards to each second unit section. The reference section, the reference vector S and the threshold value Rth form a reference index used in processing for section lengthening. The processing for section lengthening is explained in detail further below.

Figure 12:
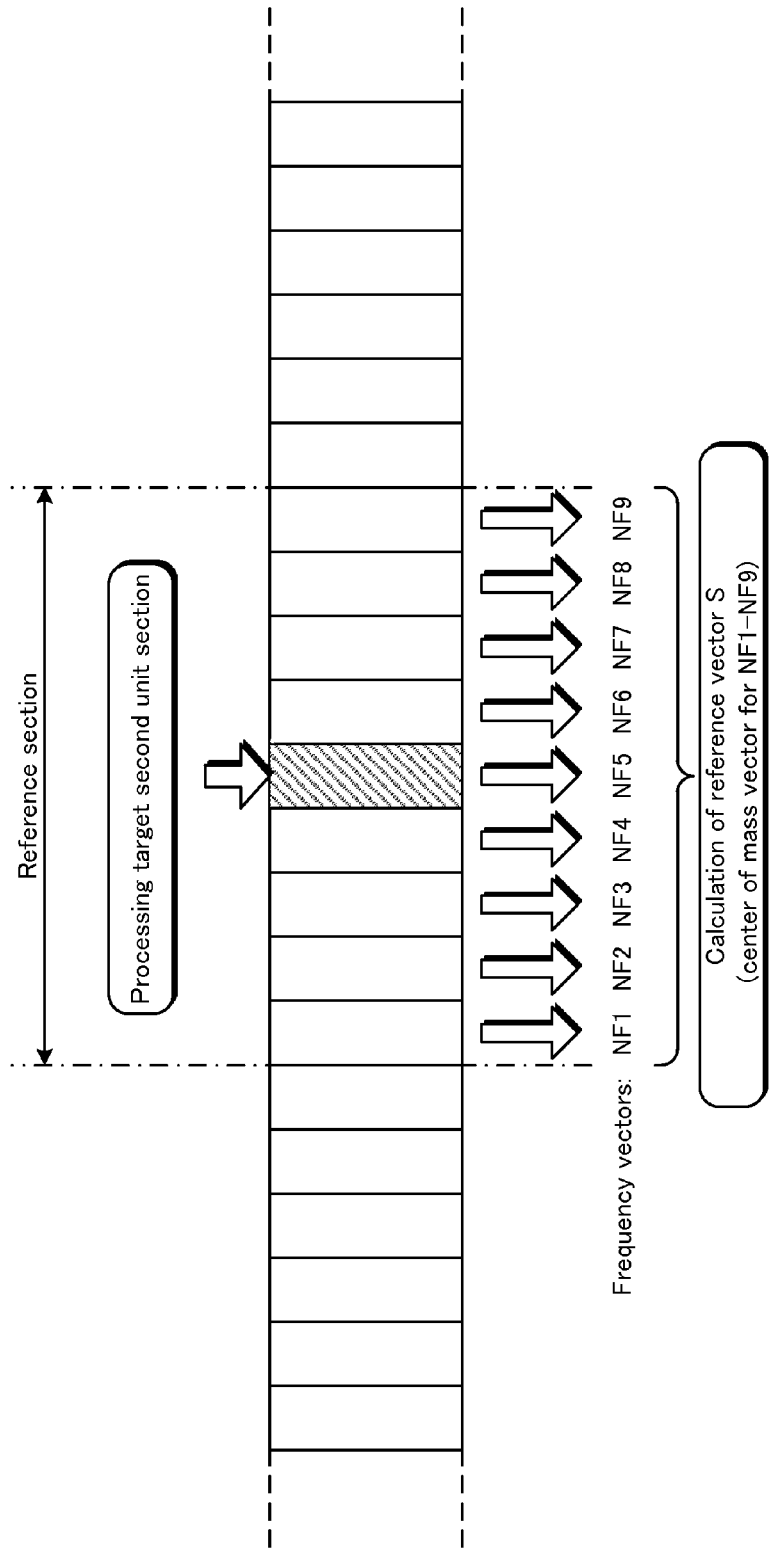
FIG. 12 illustrates an example of a reference section used in calculation of a reference vector.

The section lengthening reference index calculation unit 206 sets as the reference section, a section consisting of a plurality of second unit sections close to a second unit section which is a processing target. The section lengthening reference index calculation unit 206 acquires frequency vectors in the reference section from the frequency vector buffer 205, and calculates the reference vector S by calculating a center of mass vector of the frequencies vectors which are acquired. FIG. 12 illustrates an example in which the reference section consists of nine second unit sections close to the second unit section which is the processing target, and the reference vector S is calculated using frequency vectors (NF1-NF9) in the reference section.

The section lengthening reference index calculation unit 206 calculates a Euclidean distance between the reference vector S and each of the frequency vectors NF used in generating the reference vector S. A greatest Euclidean distance among the Euclidean distances which are calculated is set as the threshold value Rth, which is used in judging inclusion in a similarity section.

Figure 13:
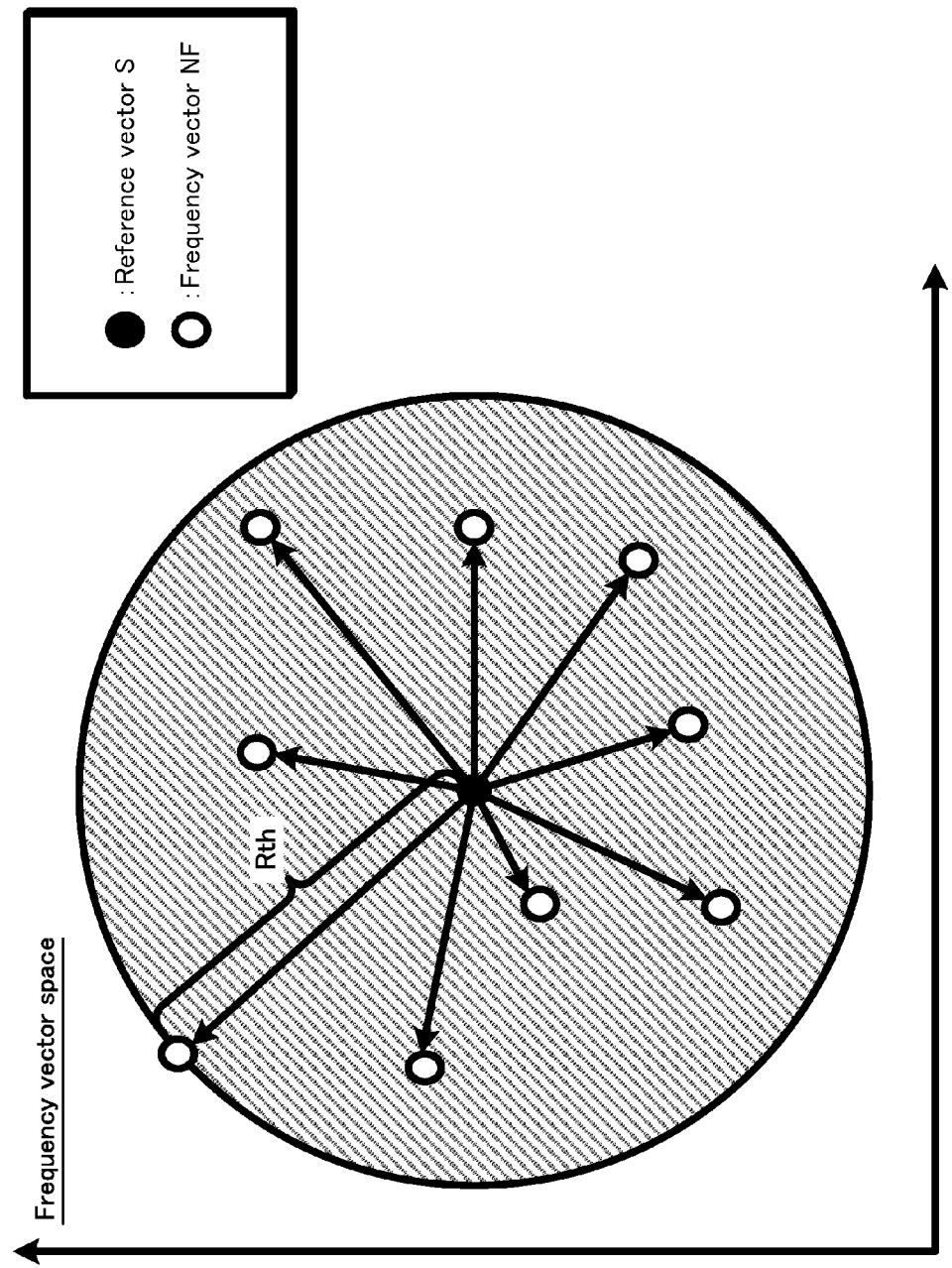
FIG. 13 illustrates the reference vector, the frequency vector and a threshold value using a conceptual diagram of a vector space.

FIG. 13 is a conceptual diagram of a vector space used to illustrate the reference vector S, each of the frequency vectors NF and the threshold value Rth. In FIG. 13, each white circle represents one of the plurality of frequency vectors NF (the frequency vectors NF1-NF9 in the reference section illustrated in FIG. 12) used in calculation of the reference vector S, and a black circle positioned centrally in a region shown by a hatched circle represents the reference vector S. Length of arrows from the reference vector S to the frequency vectors NF represent the Euclidean distances between the reference vector S and the frequency vectors NF, and the greatest Euclidean distance, among the Euclidean distances represented by the arrows, is the threshold value Rth.

<Boundary Information Calculation Unit 207>

Returning to explanation of FIG. 11, the boundary information calculation unit 207 calculates a similarity section with regards to each second unit section. The similarity section is a section in which frequency vectors are similar. The boundary information calculation unit 207 specifies a start time and an end time of the similarity section. The boundary information calculation unit 207 uses as inputs, the frequency vectors NF stored in the frequency vector buffer 205, the second unit section which is the processing target, and the reference index (reference section, reference vector S and threshold value Rth) calculated by the section lengthening reference index calculation unit 206. The boundary information calculation unit 207 outputs the start time and the end time which are specified as a piece of boundary information to the index generation unit 208.

Figure 14:
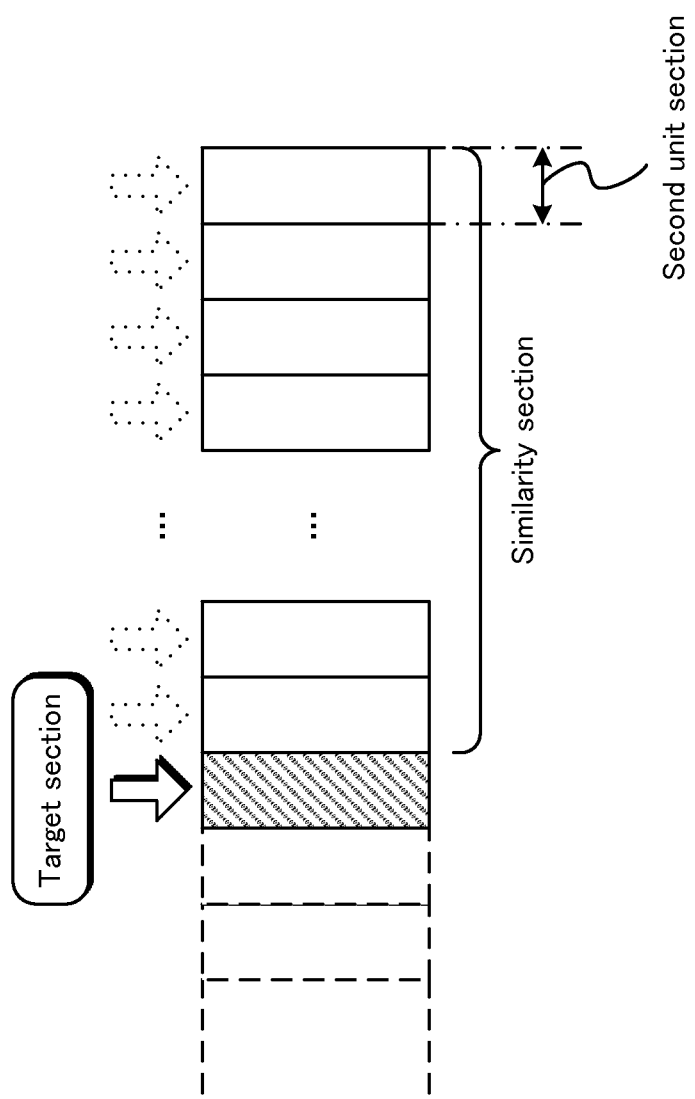
FIG. 14 is a schematic diagram illustrating processing for section lengthening of a similarity section in a reverse direction along a time axis.

First, the boundary information calculation unit 207 sets the reference section calculated by the section lengthening reference index calculation unit 206 as an initial value for the similarity section. As illustrated in FIG. 14, proceeding in a reverse direction along the time axis, the boundary information calculation unit 207 sets a second unit section directly before the similarity section as a target section, and performs a judgment as to whether to include the target section in the similarity section. More specifically, the boundary information calculation unit 207 calculates a Euclidean distance between the frequency vector NF of the target section and the reference vector S, and when the Euclidean distance does not exceed the threshold value Rth, the boundary information calculation unit 207 includes the target section in the similarity section. The boundary information calculation unit 207 repeats the above processing, and specifies the start time of the similarity section when Euclidean distance calculated thereby first exceeds the threshold value Rth.

In the above processing, the similarity section is lengthened one section at a time and thus is referred to as processing for section lengthening. The boundary information calculation unit 207 also performs processing for section lengthening in a forward direction along the time axis in order to specify the end time of the similarity section.

In the processing for section lengthening, the boundary information calculation unit 207 judges whether to include the target section in the similarity section, while also judging whether length of the similarity section is shorter than a preset upper limit le for similarity section length. When the Euclidian distance does not exceed the threshold value Rth and also the length of the similarity section is shorter than the upper limit le for similarity section length, the boundary information calculation unit 207 includes the target section in the similarity section. In contrast to the above, when the length of the similarity section is equal to or longer than the upper limit le for similarity section length, the boundary information calculation unit 207 outputs a piece of boundary information for the similarity section which is calculated at the current point in time. A preset value is used for the upper limit le for similarity section length.

The boundary information calculation unit 207 calculates a piece of boundary information for each second unit section (refer to FIG. 8).

<Index Generation Unit 208>

Figure 15:
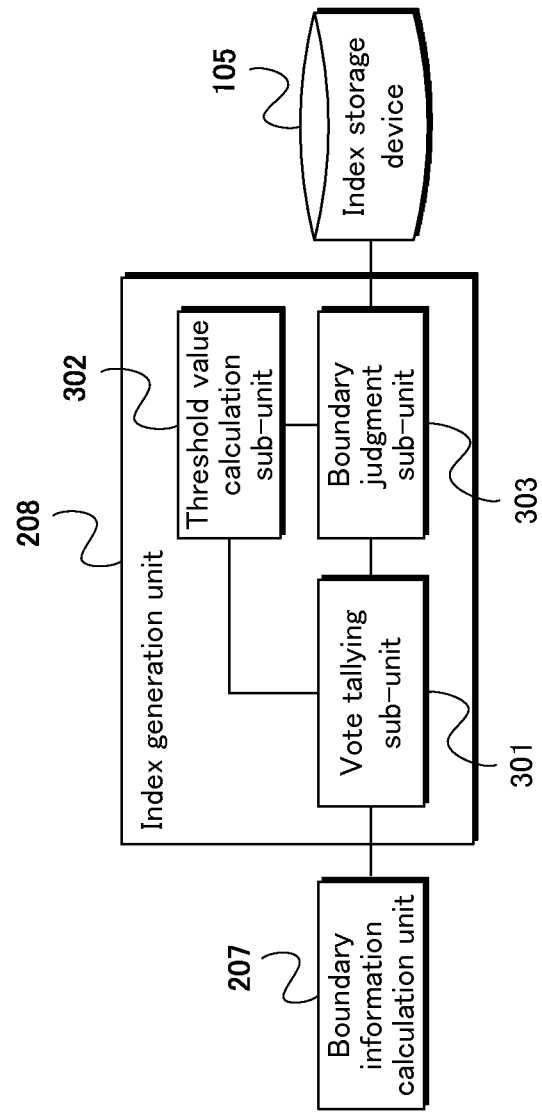
FIG. 15 is a block diagram illustrating an example of functional configuration of an index generation unit.

The index generation unit 208 detects one or more scene change points based on the pieces of boundary information calculated by the boundary information calculation unit 207. The index generation unit 208 outputs index information, indexing each scene change point which is detected, to the index storage device 105. FIG. 15 is a block diagram illustrating an example of functional configuration of the index generation unit 208. As illustrated in FIG. 15, the index generation unit 208 includes a vote tallying sub-unit 301, a threshold value calculation sub-unit 302 and a boundary judgment sub-unit 303. The following explains configuration of each of the above elements.

<Vote Tallying Sub-Unit 301>

The vote tallying sub-unit 301 calculates a boundary grading of each time indicated by one or more of the pieces of boundary information calculated by the boundary information calculation unit 207. The vote tallying sub-unit 301 calculates a number of pieces of boundary information which indicate the time as the boundary grading thereof. The vote tallying sub-unit 301 calculates the boundary gradings by, with regards to each of the pieces of the boundary information input from the boundary information calculation unit 207, tallying one vote for each time which is indicated by the piece of boundary information (for a time i, a boundary grading $KK_i$ corresponding thereto is increased by a value of 1). For each of the pieces of boundary information, the vote tallying sub-unit 301 tallies one vote for a start time indicated by the piece of boundary information and one vote for an end time indicated by the piece of boundary information.

<Threshold Value Calculation Sub-Unit 302>

The threshold value calculation sub-unit 302 calculates a threshold value TH using a mean value μ and a standard deviation σ of the boundary gradings calculated for each of the times by the vote tallying sub-unit 301. When the pieces of boundary information indicate times $T_i$ (i=1, 2, 3, . . . , N) which correspond to boundary gradings $KK_i$ (i=1, 2, 3, . . . , N), the mean value μ, the standard deviation σ and the threshold value TH can be calculated using equations shown below respectively in MATH 1-3.

$$\mu = \frac{1}{N} \sum_{i=1}^{N} KK_i \qquad \text{[MATH 1]}$$

$$\sigma = \sqrt{\frac{1}{N} \sum_{i=1}^{N} (KK_i - \mu)^2} \qquad \text{[MATH 2]}$$

$$TH = \mu + 2\sigma \qquad \text{[MATH 3]}$$

<Boundary Judgment Sub-Unit 303>

Using the boundary gradings $KK_i$ calculated for each of the times by the vote tallying sub-unit 301 and the threshold value TH calculated by the threshold value calculation sub-unit 302, the boundary judgment sub-unit 303 judges for each of the times, whether the time is a scene change point by judging whether a condition shown below in MATH 4 is satisfied. The boundary judgment sub-unit 303 subsequently outputs each time judged to be a scene change point as index information to the index storage device 105.

$$KK_i > TH \qquad \text{[MATH 4]}$$

The audio processing device 104 generates index information for the video file though the configurations described above. The following continues explanation of configuration of the video viewing apparatus 100 illustrated in FIG. 8.

<Anchor Model Creation Device 107 (Detailed Explanation)>

The Anchor Model creation device 107 is configured by a memory (not illustrated) and one or more processors (not illustrated). The Anchor Model creation device 107 implements a configuration shown in FIG. 16 through execution by the processor of a program written in the memory.

Figure 16:
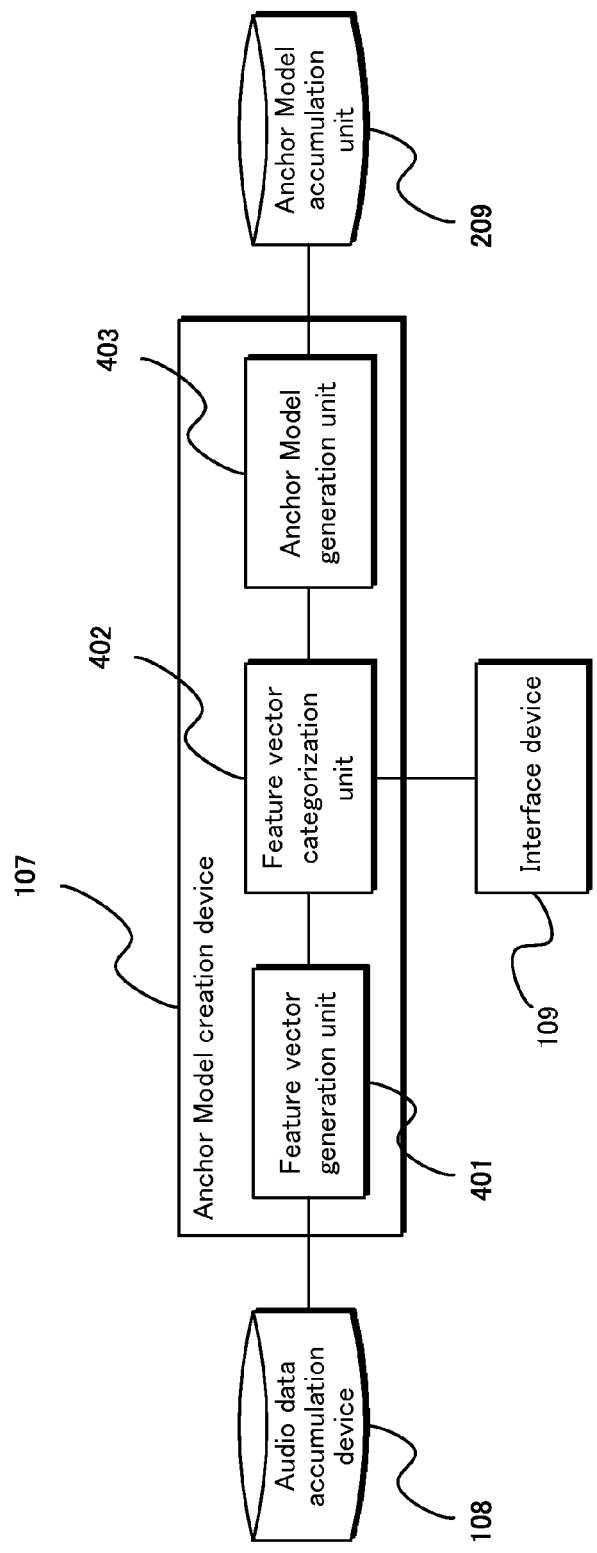
FIG. 16 is a block diagram illustrating an example of functional configuration of an Anchor Model creation device.

FIG. 16 is a block diagram illustrating functional configuration of the Anchor Model creation device 107 and other related devices. As illustrated in FIG. 16, the Anchor Model creation device 107 includes a feature vector generation unit 401, a feature vector categorization unit 402 and an Anchor Model generation unit 403. The Anchor Model creation device 107 has a function of creating Anchor Models based on audio data stored in the audio data accumulation device 108, and subsequently storing the Anchor Models in the Anchor Model accumulation unit 209. The following explains configuration of each of the above elements.

<Feature Vector Generation Unit 401>

The feature vector generation unit 401 generates a feature vector M for each first unit section, based on audio data stored in the audio data accumulation device 108.

<Feature Vector Categorization Unit 402>

The feature vector categorization unit 402 performs clustering (categorization) of the feature vectors generated by the feature vector generation unit 401.

Based on the number K of Anchor Models $A_r$, which is input from the interface device 109, the feature vector categorization unit 402 categorizes the feature vectors M into K clusters using K-means clustering. In the present embodiment K=1024.

<Anchor Model Generation Unit 403>

The Anchor Model generation unit 403 calculates mean and variance values of each of the K clusters categorized by the feature vector categorization unit 402, and stores the K clusters in the Anchor Model accumulation unit 209 as Anchor Models $A_r$ (r=1, 2, ..., K).

1-4. Operation

The following explains operation of the audio processing device 104 relating to the present embodiment with reference to the drawings.

<General Operation of Audio Processing Device>

Figure 17:
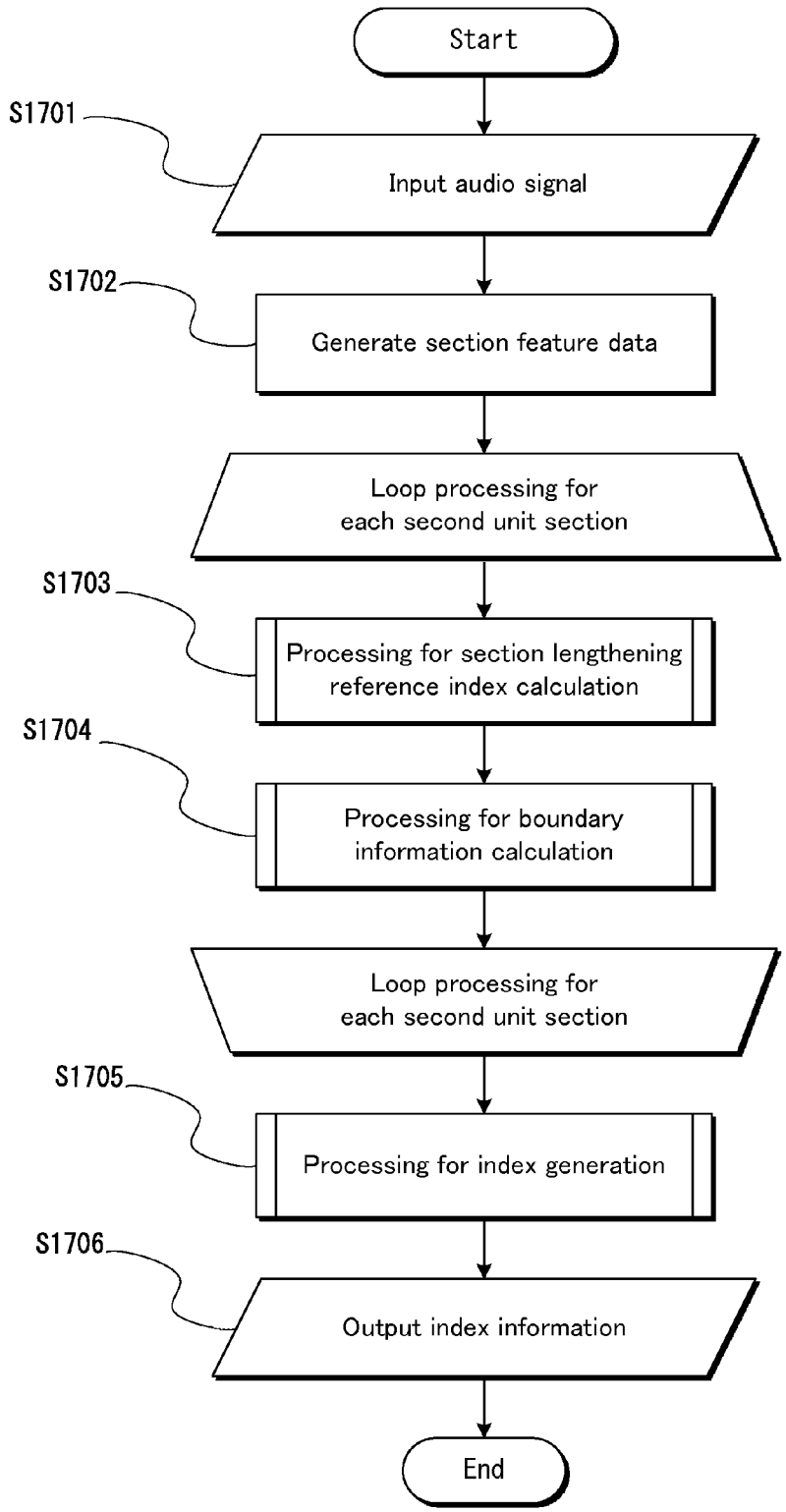
FIG. 17 is a flowchart illustrating operations of the audio processing device.

FIG. 17 is a flowchart illustrating operations of the audio processing device 104. As illustrated in FIG. 17, first an audio signal is input into the audio processing device 104 (Step S1701).

Next, the audio processing device 104 uses the audio signal which is input in order to generate section feature data (feature vectors, likelihood vectors and frequency vectors) expressing features of the audio signal in each second unit section (Step S1702).

Generation of the section feature data includes processing for feature vector generation performed by the feature vector generation unit 201, processing for likelihood vector generation performed by the likelihood vector generation unit 202, and processing for frequency vector generation performed by the frequency vector generation unit 204.

Once frequency vector generation is completed, the audio processing device 104 selects a second unit section as a processing target, and executes processing for section lengthening reference index calculation performed by the section lengthening reference index calculation unit 206 in Step S1703 and processing for boundary information calculation performed by the boundary information calculation unit 207 in Step S1704. The audio processing device 104 executes loop processing until processing in Steps S1703 and S1704 is performed with regards to each second unit section.

Once the loop processing is completed, the index generation unit 208 of the audio processing device 104 performs processing for index generation (Step S1705).

Finally, the audio processing device 104 outputs index information generated by the index generation unit 208 to the index storage device 105 (Step S1706).

<Processing for Reference Index Calculation>

Figure 18:
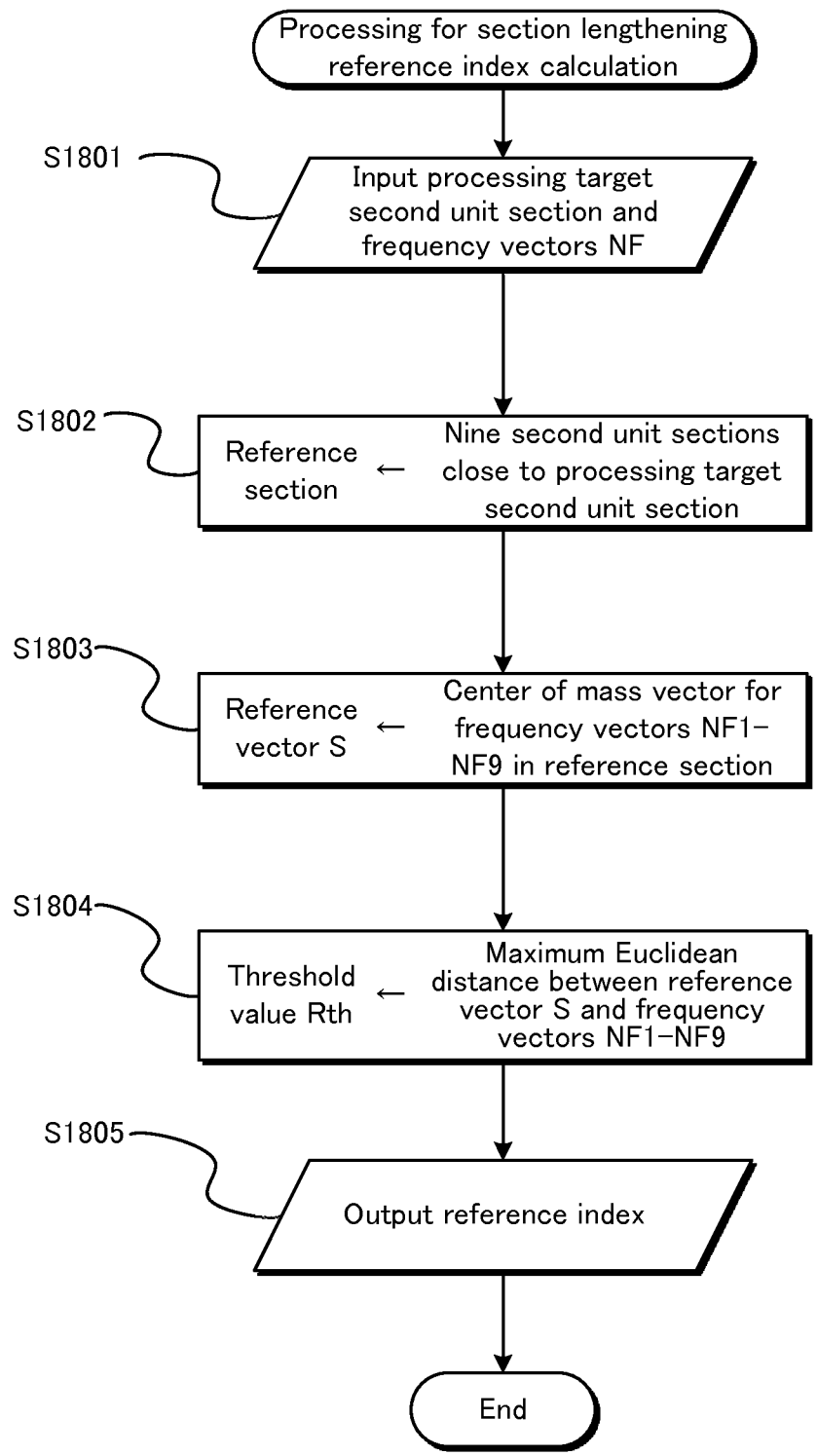
FIG. 18 is a flowchart illustrating processing for section lengthening reference index calculation.

FIG. 18 is a flowchart illustrating in detail the processing for reference index calculation performed by the section lengthening reference index calculation unit 206 in Step S1703 of FIG. 17. As illustrated in FIG. 18, the second unit section which is the processing target and the frequency vectors stored in the frequency vector buffer 205 are used as input in the processing for reference index calculation (Step S1801).

The section lengthening reference index calculation unit 206 sets as a reference section, a section of nine second unit sections in length consisting of the second unit section which is the processing target and four second unit sections both before and after the second unit section which is the processing target (Step S1802).

Next, the section lengthening reference index calculation unit 206 calculates a center of mass vector of frequency vectors (NF1-NF9) in the reference section, which are input from the frequency vector buffer 205, and sets the center of mass vector as a reference vector S (Step S1803).

The section lengthening reference index calculation unit 206 calculates Euclidean distances D(S, NF1)-D(S, NF9) between the reference vector S and the frequency vectors (NF1-NF9) in the reference section, and sets a greatest among the Euclidean distances as a threshold value Rth (Step S1804).

Finally, the section lengthening reference index calculation unit 206 outputs a reference index calculated thereby to the boundary information calculation unit 207 (Step S1805).

<Processing for Boundary Information Calculation>

Figure 19:
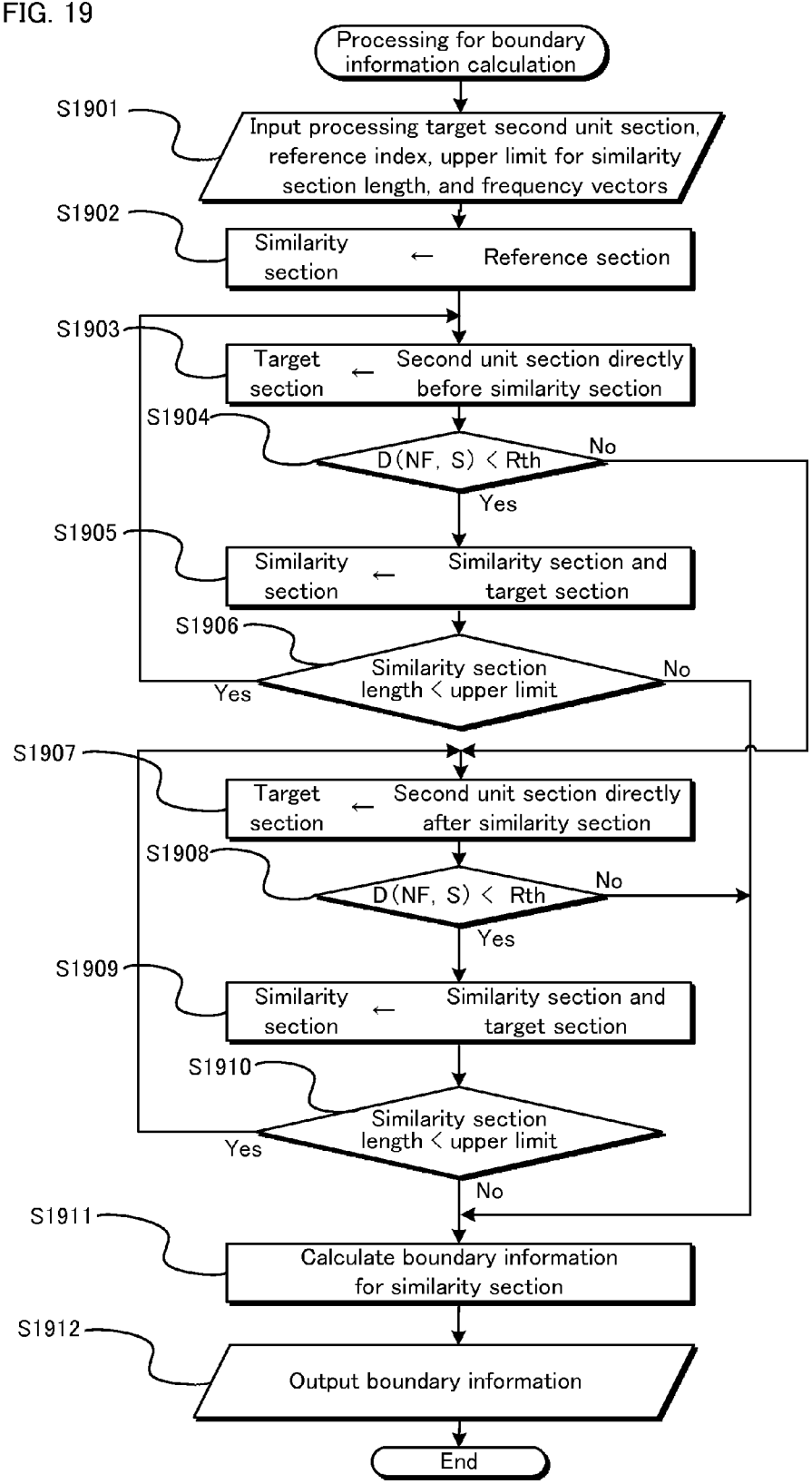
FIG. 19 is a flowchart illustrating processing for boundary information calculation.

FIG. 19 is a flowchart illustrating in detail the processing for boundary information calculation performed by the boundary information calculation unit 207 in Step S1704 of FIG. 17. As illustrated in FIG. 19, the second unit section which is the processing target, the reference index calculated by the section lengthening reference index calculation unit 206, the preset upper limit for similarity section length, and the frequency vectors stored in the frequency vector buffer 205 are used as input in the processing for boundary information calculation (Step S1901).

The boundary information calculation unit 207 sets the reference section input from the section lengthening reference index calculation unit 206 as an initial value for a similarity section (Step S1902).

Next, the boundary information calculation unit 207 executes processing in Steps S1903-S1906 with regards to the initial value of the similarity section set in Step S1902, thus performing processing for section lengthening in the reverse direction along the time axis of the audio signal.

The boundary information calculation unit 207 sets a second unit section directly before the similarity section along the time axis of the audio signal as a target section (Step S1903).

The boundary information calculation unit 207 calculates a Euclidean distance D(NF, S) between a frequency vector NF of the target section, input from the frequency vector buffer 205, and the reference vector S input from the section lengthening reference index calculation unit 206. The boundary information calculation unit 207 performs a comparison of the Euclidean distance D(NF, S) and the threshold value Rth input from the section lengthening reference index calculation unit 206 (Step S1904).

When the Euclidean distance D(NF, S) is less than the threshold value Rth (Step S1904: Yes), the boundary information calculation unit 207 updates the similarity section so as to include the target section (Step S1905).

Once the boundary information calculation unit 207 has updated the similarity section, the boundary information calculation unit 207 performs a comparison of length of the similarity section and the upper limit le for similarity section length (Step S1906). When length of the similarity section is shorter than the upper limit le (Step S1906: Yes), the boundary information calculation unit 207 repeats processing from Step S1803. When length of the similarity section is equal to or longer than the upper limit le (Step S1906: No), the boundary information calculation unit 207 proceeds to processing in Step S1911.

When the Euclidean distance D(NF, S) is greater than or equal to the threshold value Rth (Step S1904: No), the boundary information calculation unit 207 ends processing for section lengthening in the reverse direction along the time axis of the audio signal and proceeds to Steps S1907-1910 to perform processing for section lengthening in the forward direction along the time axis of the audio signal.

The processing for section lengthening in the forward direction only differs from the processing for section lengthening in the reverse direction in terms that a second unit section directly after the similarity section is set as a target section in Step S1907. Therefore, explanation of the processing for section lengthening in the forward direction is omitted.

Once the processing for section lengthening in the reverse direction and the processing for section lengthening in the forward direction are completed, the boundary information calculation unit 207 calculates a start time and an end time of the similarity section as a piece of boundary information (Step S1911).

Finally, the boundary information calculation unit 207 outputs the piece of boundary information which is calculated to the index generation unit 208 (Step S1912).

<Processing for Index Generation>

Figure 20:
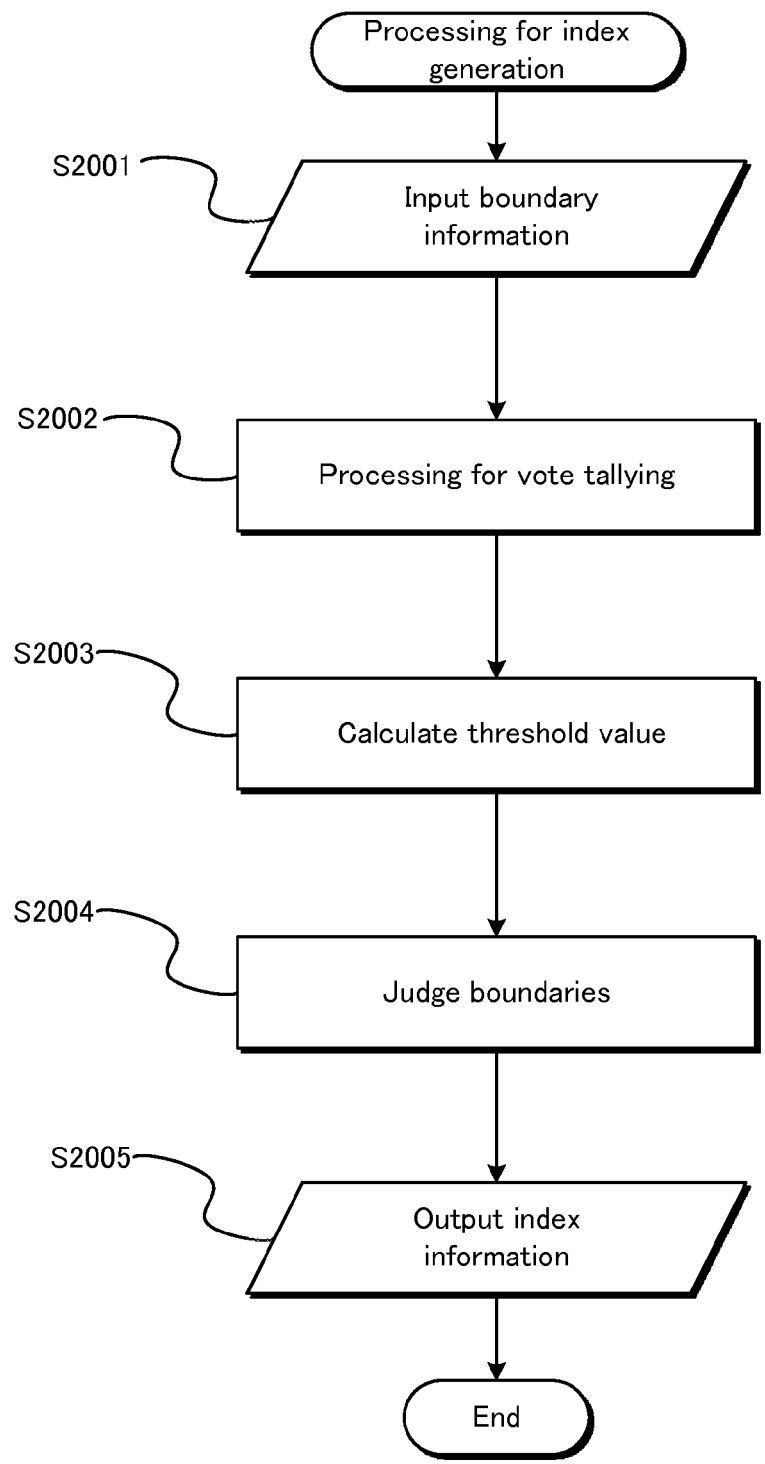
FIG. 20 is a flowchart illustrating processing for index generation.

FIG. 20 is a flowchart illustrating operations in processing for index generation performed by the index generation unit 208 in Step S1705 of FIG. 17. As illustrated in FIG. 20, pieces of boundary information calculated by the boundary information calculation unit 207 are used as input in the processing for index generation (Step S2001).

When pieces of the boundary information are input from the boundary information calculation unit 207, the vote tallying sub-unit 301 tallies one vote for each time indicated by a piece of boundary information, thus calculating a boundary grading for each of the times (Step S2002).

Once the vote tallying processing in Step S1902 is completed, the threshold value calculation sub-unit 302 calculates a threshold value using the boundary gradings calculated by the vote tallying sub-unit 301 (Step S2003).

The boundary judgment sub-unit 303 detects one or more change points using the boundary gradings calculated by the vote tallying sub-unit 301 and the threshold value calculated by the threshold value calculation sub-unit 302. The boundary judgment unit 303 generates index information which indexes each of the scene change points which is detected (Step S2004).

The boundary judgment sub-unit 303 outputs the index information which is generated to the index storage device 105 (Step S2005).

1-5. Summary

The audio processing device relating to the present embodiment calculates section feature data (feature vectors, likelihood vectors and frequency vectors) for each unit section of predetermined length in an audio signal. The section feature data expresses features of the audio signal in the unit section. The audio processing device subsequently sets a similarity section for each of the unit sections, consisting of unit sections having similar section feature data, and detects one or more scene change points from among boundaries of the similarity sections.

Through the above configuration, the audio processing device is able to detect a scene change point even when audio information changes gradually close to the scene change point.

Furthermore, with regards to the pieces of boundary information calculated for the unit sections, the audio processing device calculates a number of the pieces of boundary information indicating each boundary to be a priority (grading) of the boundary. The audio processing device only indexes the boundary as a scene change point when the priority of the boundary exceeds a threshold value.

Through the above configuration, the audio processing device is able to prioritize boundaries calculated from a large number of unit sections (second unit sections) when detecting scene change points desired by the user. Furthermore, by selecting scene change points which are to be indexed, the user is able to easily search for a desired scene.

Second Embodiment

A second embodiment differs in comparison to the first embodiment with regards to two points.

One difference is in terms of method used for calculating boundary gradings. In the first embodiment a number of pieces of boundary information indicating a certain time is calculated as a boundary grading of a boundary at the time. In the second embodiment, a largest boundary change value among boundary change values of pieces of boundary information indicating a certain time is calculated as a boundary grading of a boundary at the time. Herein, a boundary change value is calculated as an indicator of a degree of change of section feature data (feature vectors, likelihood vectors and frequency vectors) in a similarity section, and is included in the piece of boundary information relating to the similarity section.

The other difference compared to the first embodiment is in terms of index information. In the first embodiment, only a time of each scene change point is used as index information. In the second embodiment, categorization information categorizing audio environment information of each scene change point is also attached to the index information. The audio environment information is information expressing features of the audio signal at the scene change point and is calculated by the boundary information calculation unit as a piece of boundary information relating to a similarity section by using section feature data in the similarity section.

The following explains an audio processing device relating to the present embodiment. Configuration elements which are the same as in the first embodiment are labeled using the same reference signs and explanation thereof is omitted.

2-1. Configuration

Figure 21:
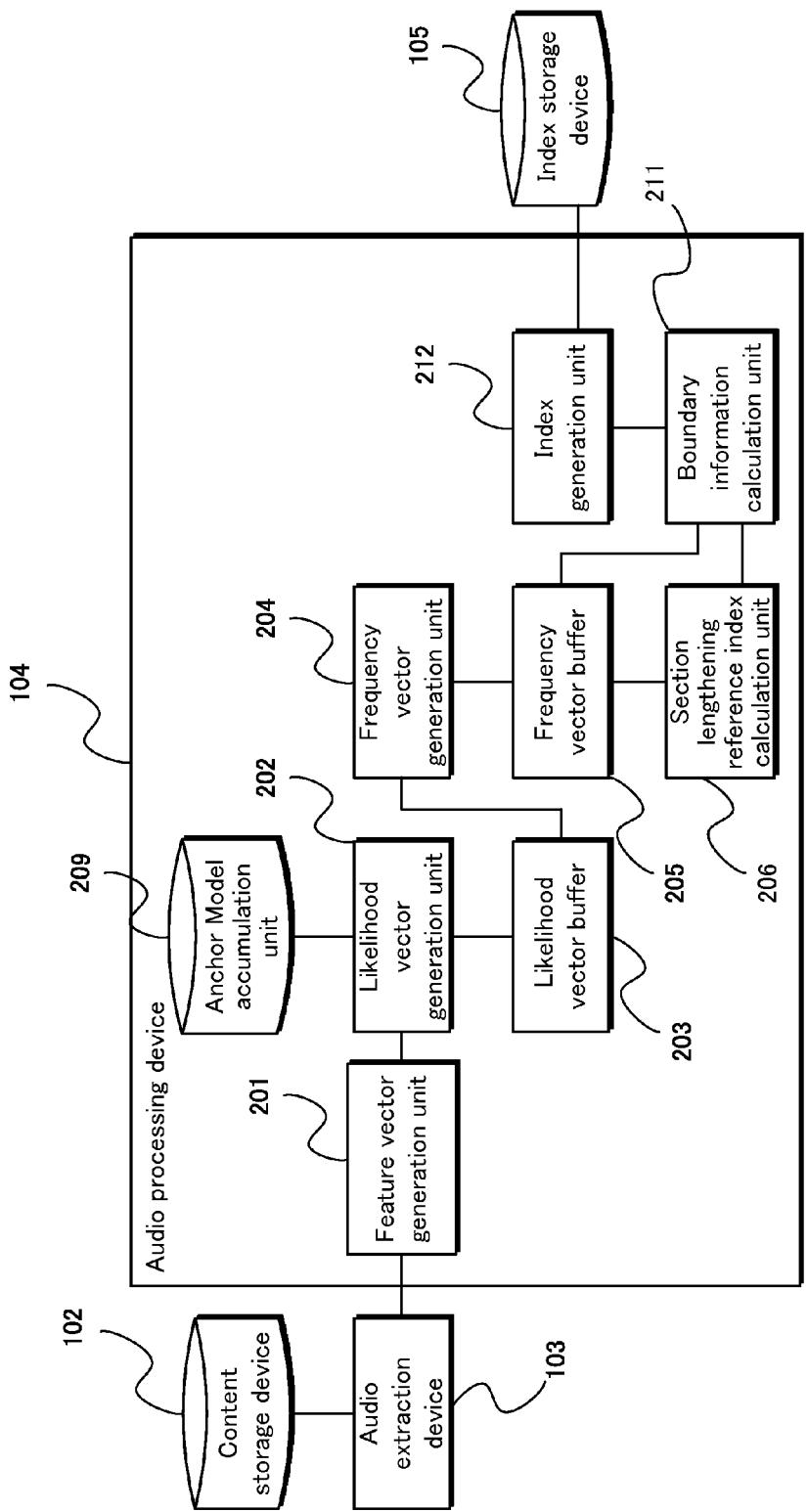
FIG. 21 is a block diagram illustrating an example of functional configuration of an audio processing device.

FIG. 21 is a block diagram illustrating an example of functional configuration of an audio processing device 110 relating to the second embodiment. In comparison to the audio processing device 104 relating to the first embodiment, the audio processing device 110 includes a boundary information calculation unit 211 instead of the boundary information calculation unit 207, and an index generation unit 212 instead of the index generation unit 208.

<Boundary Information Calculation Unit 211>

In addition to functions of the boundary information calculation unit 207, the boundary information calculation unit 211 has a function of further calculating as the piece of boundary information, a boundary change value which indicates a degree of change between features of the audio signal close to the second unit section which is the processing target and features of the audio signal at a boundary of the similarity section. The boundary information calculation unit 211 also has a function of further calculating as the piece of boundary information, audio environment information which indicates an audio environment which is representative of the similarity section.

In the present invention, the boundary information calculation unit 211 uses as a start change value $D_{in}$ (boundary change value at the start time of the similarity section), a Euclidean distance which exceeds the threshold value Rth among the Euclidean distances calculated between the reference vector S and each of the frequency vectors NF when performing processing for section lengthening in the reverse direction along the time axis. In other words, the boundary information calculation unit 211 uses a Euclidean distance between the reference vector S and a frequency vector NF of a second unit section directly before the similarity section. When a second unit section does not exist directly before the similarity section, the boundary information calculation unit 211 uses a second unit section in the similarity section which is closest to the start time. In the same way, the boundary information calculation unit 211 uses as an end change value $D_{out}$ (boundary change value at the end time of the similarity section), a Euclidean distance between the reference vector S and a frequency vector NF of a second unit section directly after the similarity section.

The boundary information calculation unit 211 uses the reference vector S as the audio environment information.

As illustrated in FIG. 22, a piece of boundary information calculated by the boundary information calculation unit 211 includes a start time, a start change value, an end time, an end change value and audio environment information of a similarity section to which the piece of boundary information relates.

<Index Generation Unit 212>

Figure 23:
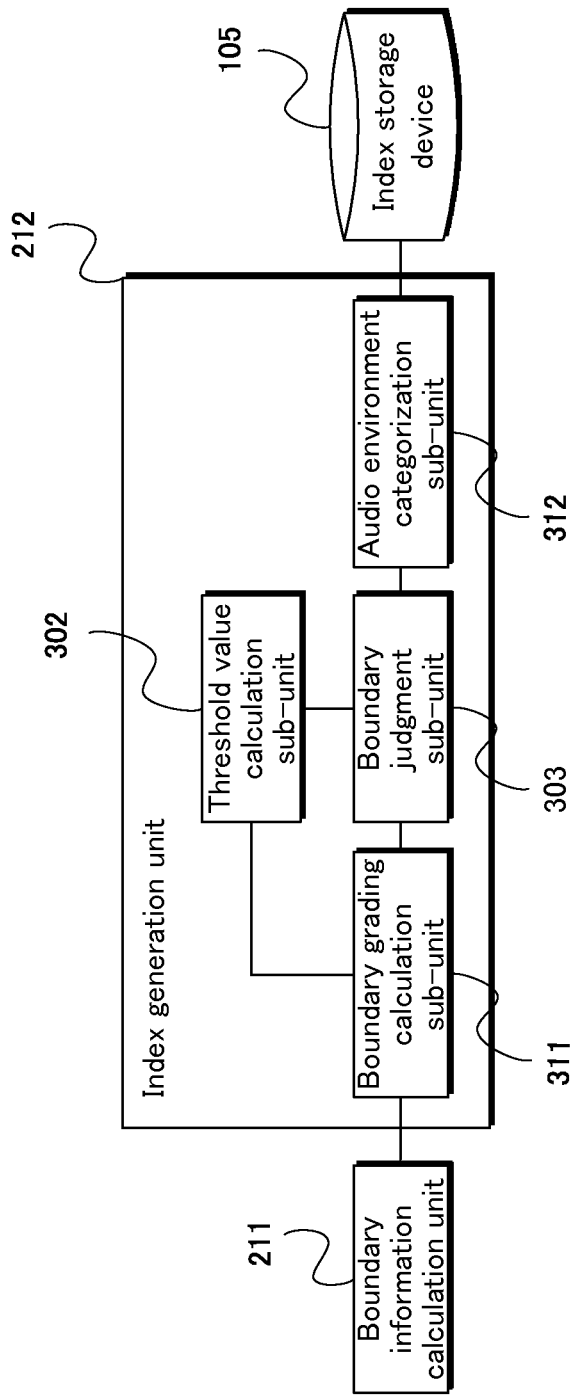
FIG. 23 is a block diagram illustrating an example of functional configuration of an index generation unit.

FIG. 23 is a block diagram illustrating an example of functional configuration of the index generation unit 212. In comparison to the index generation unit 208 relating to the first embodiment, the index generation unit 212 includes a boundary grading calculation sub-unit 311 instead of the vote tallying sub-unit 301. The index generation unit 212 further includes an audio environment categorization sub-unit 312, which is provided between the boundary judgment sub-unit 303 and the index storage device 105.

<Boundary Grading Calculation Sub-Unit 311>

The boundary grading calculation sub-unit 311 calculates a boundary grading for each time indicated by one or more of the pieces of boundary information calculated by the boundary information calculation unit 211. The boundary grading calculation sub-unit 311 calculates the boundary grading by calculating a largest boundary change value among boundary change values included in the pieces of boundary information indicating the time. More specifically, the boundary grading calculation sub-unit 311 calculates a boundary grading of a time $T_i$ by calculating a largest value among start change values of pieces of boundary information indicating $T_i$ as a start time and end change values of pieces of boundary information indicating time $T_i$ as an end time.

Furthermore, the boundary grading calculation sub-unit 311 sets audio environment information of each boundary (time) as audio environment information included in a piece of boundary information giving a largest boundary change value for the boundary.

<Audio Environment Categorization Sub-Unit 312>

The audio environment categorization sub-unit 312 categorizes audio environment information set for each of the times which is judged to be a scene change point by the boundary judgment sub-unit 303. The audio environment categorization sub-unit 312 for example categorizes the audio environment information into a plurality of groups (three for example) using a K-means method. The audio environment categorization sub-unit 312 attaches categorization information resulting from the categorization to the index information, and outputs the index information with the categorization information attached thereto to the index storage device 105. FIG. 24 illustrates an example of categorization information attached to the index information.

2-2. Summary

In the present embodiment, the audio processing device uses as a boundary grading, a largest value among boundary change values, which each indicate a degree of change of features of the audio signal in a similarity section. Change in features of the audio signal often occurs in accompaniment to movement of a subject in the video file corresponding to the audio signal. In other words, by using the largest value among the boundary change values as the boundary grading, the audio processing device relating to the present embodiment is able to prioritize detection of a scene in which movement of a subject occurs.

The audio processing device in the present embodiment attaches categorization information to the index information, wherein the categorization information relates to categorization of audio environment information of each scene change point. Through use of the categorization information, the video viewing apparatus is able to provide the user with various user interface functionalities.

For example, the video viewing apparatus may have a configuration in which a progress bar is displayed in a manner such that the user can differentiate between scene change points categorized into different groups. For example, scene change points categorized into different groups may be displayed using different colors, or may be marked using symbols of different shapes. Through the above configuration, the user is able to understand a general configuration of scenes in an AV content by viewing the progress bar and can search for a desired scene more intuitively.

Alternatively, the video viewing apparatus may have a configuration which displays a progress bar in a manner which emphasizes display of scene change points which are categorized in a same group as a scene change point of a scene which is currently being viewed. Through the above configuration, the user is able to quickly skip to a scene which is similar to the scene which is currently being viewed.

3. Modified Examples

The audio processing device relating to the present invention is explained using the above embodiments, but the present invention is not limited to the above embodiments. The following explains various modified examples which are also included within the scope of the present invention.

(1) In the above embodiments, the audio processing device calculates a boundary grading of a boundary by calculating a number of pieces of boundary information indicating the boundary or by calculating a largest value among boundary change values indicated for the boundary by the pieces of boundary information indicating the boundary. However, the above is not a limitation on the present invention. For example, alternatively a cumulative value of boundary change values indicated by the pieces of boundary information indicating the boundary may be calculated as the boundary grading. Through the above configuration, the audio processing device is able to prioritize detection of a boundary which is calculated from a large number of unit sections (second unit sections) and which is for a scene in which a large change occurs in features of the audio signal.

(2) In the above embodiments, the boundary information calculation unit calculates both the start time and the end time of the similarity section as the piece of boundary information, but alternatively the boundary information calculation unit may calculate only one out of the start time or the end time. Of course, in a configuration in which only the start time is calculated, performance of processing for section lengthening in the forward direction along the time axis is not necessary. Likewise, in a configuration in which only the end time is calculated, performance of processing for section lengthening in the reverse direction along the time axis is not necessary.

(3) In the above embodiments, the threshold calculation sub-unit calculates the threshold value using the equation in MATH 3, but the method for calculating the threshold value is not limited to the above. For example, alternatively the equation shown below in MATH 5 may be used in which a coefficient k is varied between values of 0 and 3.

$$TH = \mu + k\sigma \quad \text{[MATH 5]}$$

Alternatively, the threshold value calculation sub-unit may calculate a plurality of threshold values and the boundary judgment unit may calculate scene change points with regards to each of the plurality of threshold values. For example, the threshold value calculation sub-unit may calculate a first threshold value TH1 for the coefficient k set as 0, and the boundary judgment sub-unit may calculate scene change points with regards to the first threshold value TH1. Next, the threshold value calculation sub-unit may calculate a second threshold value TH2 for the coefficient k set as 2, and the boundary judgment sub-unit may calculate scene change points with regards to the second threshold value TH2.

In the above configuration, the scene change points detected when using the first threshold value TH1, which is smaller than the second threshold value TH2, may be estimated to be boundaries of shorter sub-scenes which are each included in a longer scene. For example, the boundaries may be of scenes 21 and 22 illustrated in FIG. 1 which are included in scene 20. On the other hand, the scene change points detected when using the second threshold value TH2, which is larger than the first threshold value TH1, may be estimated to be boundaries of long scenes which each include a plurality of shorter sub-scenes. For example, the boundaries may be of scene 20 illustrated in FIG. 1 which includes scenes 21 and 22.

In other words, in a configuration in which scene change points are detected with regards to each of a plurality of threshold values, the threshold value calculation sub-unit and the boundary judgment sub-unit function as a scene structure estimation unit which estimates a hierarchical structure of scenes in the audio signal.

(4) In the above embodiments, the boundary judgment sub-unit detects a time as a scene change point when a boundary grading thereof exceeds the threshold value input from the threshold value calculation sub-unit. However, the above is not a limitation on the present invention. Alternatively, the boundary judgment sub-unit may for example detect a predetermined number N (N is a positive integer) of times as scene change points in order of highest boundary grading thereof. The predetermined number N may be determined in accordance with length of the audio signal. For example, the boundary judgment sub-unit may determine the predetermined number N to be 10 with regards to an audio signal which is 10 minutes in length, and may determine the predetermined number N to be 20 with regards to an audio signal which is 20 minutes in length.

Further alternatively, the boundary judgment sub-unit may detect a predetermined number N (N is a positive integer) of times as first scene change points in order of highest boundary grading thereof, and may determine a predetermined number M (M is an integer greater than N) of times as second scene change points in order of highest boundary grading thereof.

In the above configuration, the first scene change points may be estimated to be boundaries of long scenes each including a plurality of shorter sub-scenes, such as scene 20 illustrated in FIG. 1 which includes scenes 21 and 22. Also, the second scene change points may be estimated to be boundaries of short sub-scenes each included in a longer scene, such as scenes 21 and 22 illustrated in FIG. 1 which are included in scene 20.

In other words, in the above configuration in which first scene change points and second scene change points are detected, the boundary detection sub-unit functions as a scene structure estimation unit which estimates a hierarchical structure of scenes in the audio signal.

(5) In the above embodiments, a similarity section (and a piece of boundary information) is calculated for each second unit section, but the present invention is not limited by the above. For example, the boundary information calculation unit may alternatively only calculate a similarity section for every $N^{th}$ second unit section, where N is an integer greater than one. Further alternatively, the boundary information calculation unit may acquire a plurality of second unit sections which are indicated by the user, for example using the interface device, and calculate a similarity section for each of the second unit sections which is acquired.

(6) In the above embodiments, the reference section used in the processing for section lengthening index calculation, performed by the section lengthening reference index calculation unit, is a section consisting of nine second unit sections close to the second unit section which is the processing target. However, the reference section is not limited to the above. Alternatively, the reference section may for example be a section consisting of N (where N is an integer greater than one) second unit sections close to the second unit section which is the processing target.

In the above, when N is a large value the boundary information calculation unit calculates a similarity section which is relatively long. Consequently, scene change points detected by the index generation unit may be estimated to indicate boundaries of long scenes each including a plurality of shorter sub-scenes, such as scene 20 illustrated in FIG. 1 which includes scenes 21 and 22. Conversely, when N is a small value the boundary information calculation unit calculates a similarity section which is relatively short. Consequently, scene change points detected by the index generation unit may be estimated to indicate boundaries of short sub-scenes each included in a longer scene, such as scenes 21 and 22 illustrated in FIG. 1 which are included in scene 20.

In consideration of the above, the present invention may have a configuration in which the section lengthening reference index calculation unit, the boundary information calculation unit and the index generation unit detect scene change points for when N is a large value and subsequently detect scene change points for when N is a small value. Through the above configuration, the section lengthening reference index calculation unit, the boundary information calculation unit and the index generation unit are able to detect boundaries of long scenes in the audio signal and also boundaries of shorter sub-scenes which are each included in one of the long scenes. In other words, in the above configuration the section lengthening reference index calculation unit, the boundary information calculation unit and the index generation unit function as a scene structure estimation unit which estimates a hierarchical structure of scenes in the audio signal.

(7) In the above embodiments, the reference vector is explained as a center of mass vector of frequency vectors of second unit sections included in the reference section. However, the reference vector is not limited to the above. For example, the reference vector may alternatively be a vector having as components, median values of each component of the frequency vectors of the second unit sections included in the reference section. Further alternatively, if a large number of second unit sections, such as 100 second unit sections, are included in the reference section, the reference vector may be a vector having as components, modal values of each component of the frequency vectors.

(8) In the above embodiments, the boundary information calculation unit judges that the target section should be included in the similarity section when the Euclidean distance between the frequency vector of the target section and the reference vector S does not exceed the threshold value Rth, and length of the similarity section is shorter than the upper limit le for similarity section length which is set in advance. The above is in order to prevent the similarity section from becoming longer than a certain fixed length, but if there is no limitation on similarity section length, the target section may be included in the similarity section without performing processing to compare length of the similarity section to the upper limit le.

In the above embodiments a preset value is used as the upper limit le for similarity section length, however the upper limit le is not limited to the above. For example, a value set by the user through an interface may alternatively be used as the upper limit le for similarity section length.

(9) In the above embodiments, a configuration is explained wherein the processing for section lengthening of the similarity section is first performed in the reverse direction along the time axis and subsequently in the forward direction along the time axis, but alternatively the present invention may have a configuration such as explained below.

For example, the boundary information calculation unit may first perform processing for section lengthening in the forward direction along the time axis, and subsequently in the reverse direction along the time axis. Alternatively, the boundary information calculation unit may lengthen the similarity section by second unit sections alternately in the reverse and forward directions along the time axis. If the similarity section is lengthened in alternate directions, possible lengthening methods include alternating after each second unit section, or alternating after a fixed number of second unit sections (five for example).

(10) In the above embodiments, the boundary information unit judges whether to include the target section in the similarity section in accordance with a judgment of whether the Euclidean distance between the frequency vector of the target section and the reference vector exceeds the threshold value Rth. However, the Euclidean distance is not required to be used in the above judgment, so long as the judgment pertains to whether a degree of similarity between the frequency vector and the reference vector is at least some fixed value.

For example, in an alternative configuration, Kullback-Leibler (KL) divergence (also referred to as relative entropy) in both directions between mixture distributions for the reference vector and the frequency vector may be used as distance when calculating the similarity section. The mixture distributions for the reference vector and the frequency vector have as weights thereof, probability distributions defined by the Anchor Models corresponding to each of the components of the reference vector and the frequency vector respectively. In the above configuration, the threshold value Rth should also be calculated using KL divergence.

KL divergence is commonly known in probability theory and information theory as a measure of difference between two probability distributions. A KL distance between the frequency vector and the reference vector relating to an embodiment of the present invention can be calculated as follows.

First, one mixture distribution is configured using the frequency vector NF and the probability functions defined by each of the Anchor Models. Specifically, a mixture distribution $G_{NF}$ can be calculated using MATH 6 shown below, by taking the frequency vector $NF=(\alpha_1, \ldots, \alpha_r, \ldots, \alpha_{1024})$ to be the weight for the probability distributions $(b_{A1}, \ldots, b_{Ar}, \ldots, b_{A1024})$ defined by the Anchor Models.

$$G_{NF} = \sum_{i=1}^{1024} \alpha_i b_{Ai} \qquad [\text{MATH 6}]$$

A mixture distribution for the reference vector is configured in the same way as above. In other words, a mixture distribution $G_S$ can be calculated using MATH 7 shown below, by taking the reference vector $S=(\mu_1, \ldots, \mu_r, \ldots, \mu_{1024})$ to be the weight for the probability distributions $(b_{A1}, \ldots, b_{Ar}, \ldots, b_{A1024})$ defined by the Anchor Models.

$$G_S = \sum_{i=1}^{1024} \mu_i b_{Ai} \qquad [\text{MATH 7}]$$

Next, the mixture distribution $G_{NF}$ and the mixture distribution $G_S$ can be used to calculate KL divergence from the mixture distribution $G_{NF}$ to the mixture distribution $G_S$ using MATH 8 shown below.

$$D_{KL}(G_{NF} \mid G_S) = \int_X G_{NF}(x) \log \frac{G_{NF}(x)}{G_S(x)} dx \qquad [\text{MATH 8}]$$

In MATH 8, X is a set of all arguments of the mixture distribution $G_{NF}$ and the mixture distribution $G_S$.

KL divergence from the mixture distribution $G_S$ to the mixture distribution $G_{NF}$ can be calculated using MATH 9 shown below.

$$D_{KL}(G_S \mid G_{NF}) = \int_X G_S(x) \log \frac{G_S(x)}{G_{NF}(x)} dx \qquad [\text{MATH 9}]$$

MATH 8 and MATH 9 are non-symmetrical, hence KL distance between the two probability distributions can be calculated using MATH 10 shown below.

$$\text{Dist}(G_{NF}, G_S) = \frac{D_{KL}(G_{NF} \mid G_S) + D_{KL}(G_S \mid G_{NF})}{2} \qquad [\text{MATH 10}]$$

Instead of the Euclidean distance indicated in the above embodiments, the KL distance indicated in MATH 10 may be used when performing the judgment as to whether to include the target section in the similarity section. In a configuration in which KL distance is used, instead of using Euclidean distance for the threshold value Rth, a KL distance should be used which, for frequency vectors of second unit sections included in the reference section, is a greatest KL distance between any one of the frequency vectors and the reference vector.

In another example of a method which does not use Euclidean distance, correlation (cosine degree of similarity, Pearson's correlation coefficient or the like) may be calculated between the reference vector and the frequency vector of the target section. In the above method, the target section may be included in the similarity section when the correlation is at least equal to a fixed value (greater than or equal to 0.6 for example).

(11) In the above embodiments, a frequency vector of a second unit section is explained as a vector having as components thereof, normalized cumulative likelihoods of each component of likelihood vectors in the second unit section. However, so long as the frequency vector expresses features of the audio signal in a unit section and in particular is able to identify frequently occurring sound components, the frequency vector may alternatively be a vector having components other than the normalized cumulative likelihoods. For example, alternatively a cumulative likelihood may be calculated for each component of the likelihood vectors in the unit section, and the frequency vector may be a normalized vector of cumulative likelihoods corresponding to only a highest K Anchor Models (K is a value greater than 1, for example 10) in terms of cumulative likelihood. Alternatively, the frequency vector may not normalize cumulative likelihood, and may instead be a vector having the cumulative likelihoods as components thereof. Further alternatively, the frequency vector may be a vector having average values of the likelihoods as components thereof.

(12) In the above embodiments, MFCC is used for the feature vectors, but so long as features of the audio signal in each first unit section are expressed by a feature amount, the feature amount is not limited to using MFCC. For example, alternatively a frequency characteristic of the audio signal such as a power spectrum or a time series of amplitude of the audio signal may be used as the feature amount.

In the above embodiments, a 26-dimension MFCC is used due to preferable results being achieved in testing when using 26 dimensions, however feature vectors in the present invention are not limited to having 26 dimensions.

(13) In the above embodiments, an example is explained in which, using audio data accumulated in advance in the audio data accumulation device, Anchor Models $A_r$ are created (using so called unsupervised Anchor Model creation) for each of the sound pieces of various types which are categorized using clustering. However, the method of Anchor Model creation is not limited to the above. For example, with regards to audio data accumulated in the audio data accumulation device, a user may select for each of the sound pieces, pieces of the audio data corresponding to the sound piece and attach a categorizing label to each of the pieces of audio data. Pieces of audio data having the same categorizing label may then be used to create the Anchor Model for the corresponding sound piece (using so called supervised Anchor Model creation).

(14) In the above embodiments, lengths of each first unit section and each second unit section are merely examples thereof. Lengths of each first unit section and each second unit section may be different to in the above embodiment, so long as each second unit section is longer than each first unit section. Preferably, length of each second unit section should be a multiple of length of each first unit section in order to simplify processing.

(15) In the above embodiments the likelihood vector buffer, the frequency vector buffer and the Anchor Model accumulation unit are each configured as part of the memory, however so long as each of the above elements is configured as a storage device which is readable by the audio processing device, the above elements are not limited to being configured as part of the memory. For example, each of the above elements may alternatively be configured as a hard disk, a floppy disk, or an external storage device connected to the audio processing device.

(16) In regards to the audio data stored in the audio data accumulation device in the above embodiments, new audio data may be appropriately added to the audio data. Also, audio data of the video stored in the content storage device may alternatively also be stored in the audio data accumulation device.

When new audio data is added, the Anchor Model creation device 107 may create new Anchor Models.

(17) In the above embodiments, the audio processing device is explained as a configuration element provided in a video viewing apparatus, but alternatively the audio processing device may be provided as a configuration element in an audio editing apparatus. Further alternatively, the audio processing device may be provided as a configuration element in an image display apparatus which acquires a video file including an audio signal from an external device, and outputs image data corresponding to a scene change point resulting from detection as a thumbnail image.

(18) In the above embodiments, the video file is acquired from a recording medium, but the video file may alternatively be acquired by a different method. For example, the video file may alternatively be acquired from a wireless or wired broadcast or network. Further alternatively, the audio processing device may include an audio input device such as a microphone, and scene change points may be detected from an audio signal input via the audio input device.

(19) Alternatively, the audio processing device in any of the above embodiments may be connected to a network and the present invention may be implemented as a video viewing system including the audio processing device and at least one terminal attached thereto through the network.

In a video viewing system such as described above, one terminal may for example transmit a video file to the audio processing device and the audio processing device may detect scene change points from the video file and subsequently transmit the scene change points to the terminal.

Through the above configuration, even a terminal which does not have an editing functionality, such as for detecting scene change points, is able to play a video on which editing (detection of scene change points) has been performed.

Alternatively, in the above video viewing system functions of the audio processing device may be divided up and the terminal may be provided with a portion of the divided up functions. In the above configuration, the terminal which has the portion of the divided up functions is referred to as a client and a device provided with the remaining functions is referred to as a server.

Figure 25:
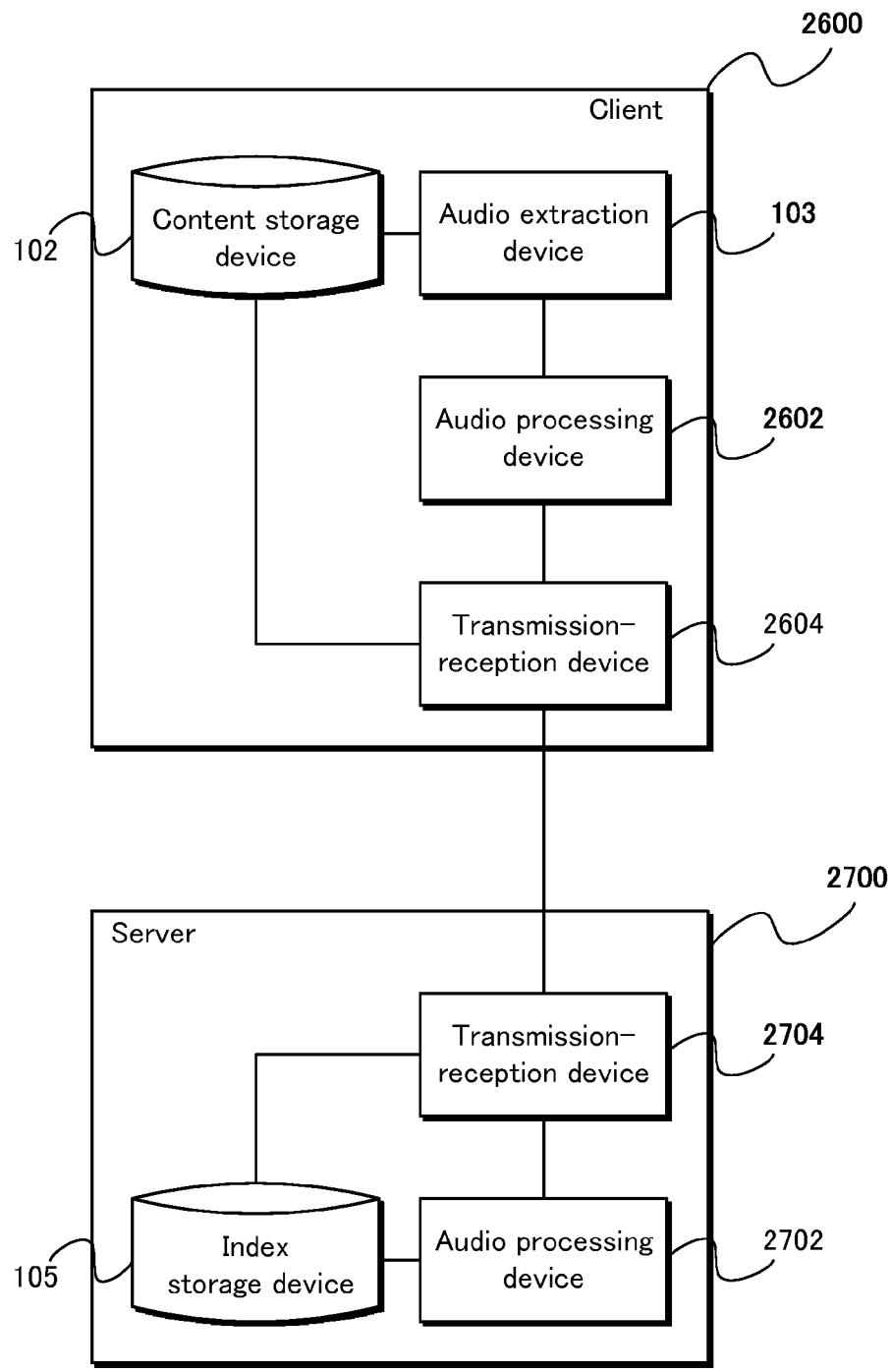
FIG. 25 is a block diagram illustrating an example of configuration of a video viewing system.
Figure 26:
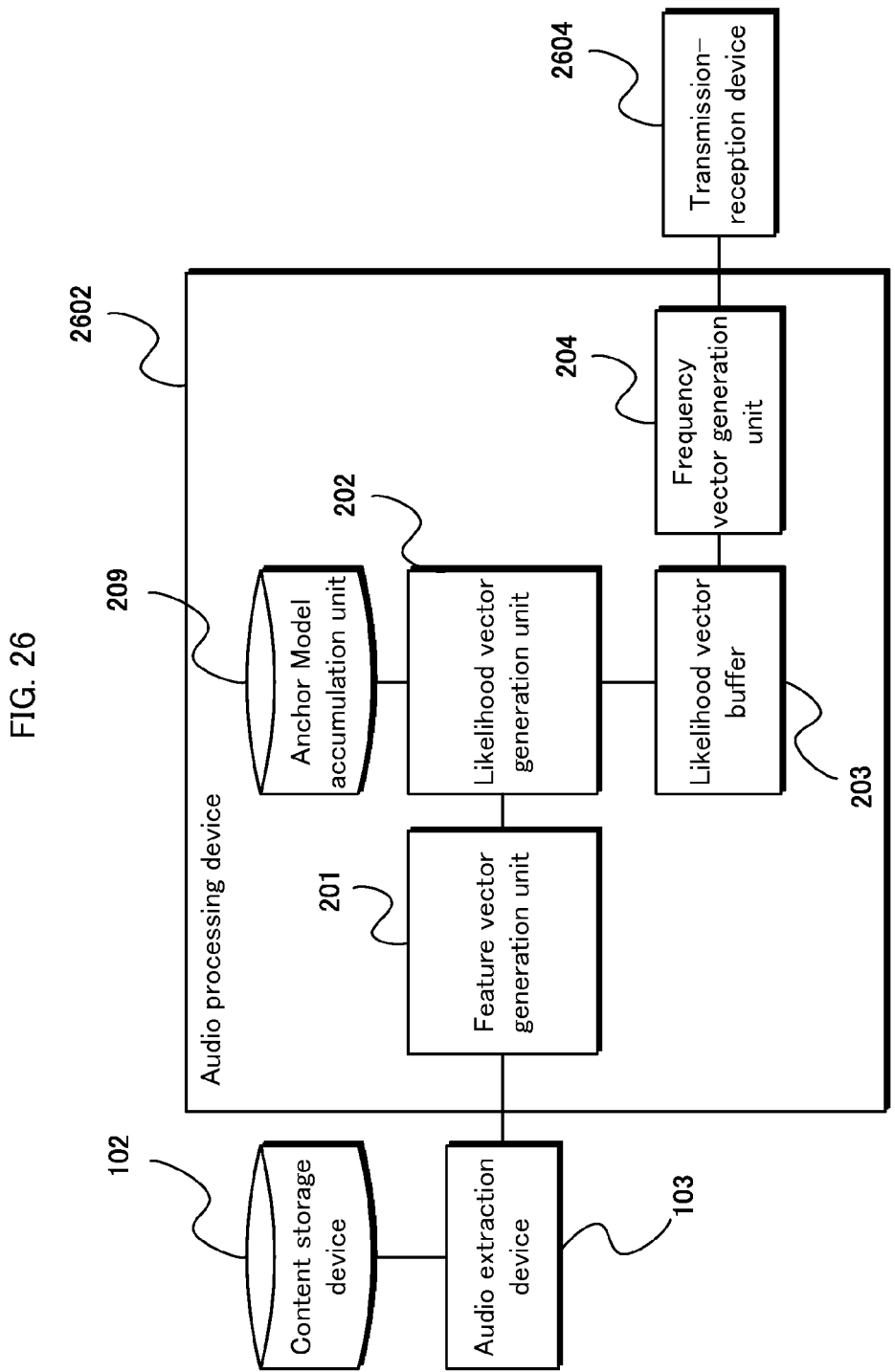
FIG. 26 is a block diagram illustrating an example of configuration of a client in the video viewing system.
Figure 27:
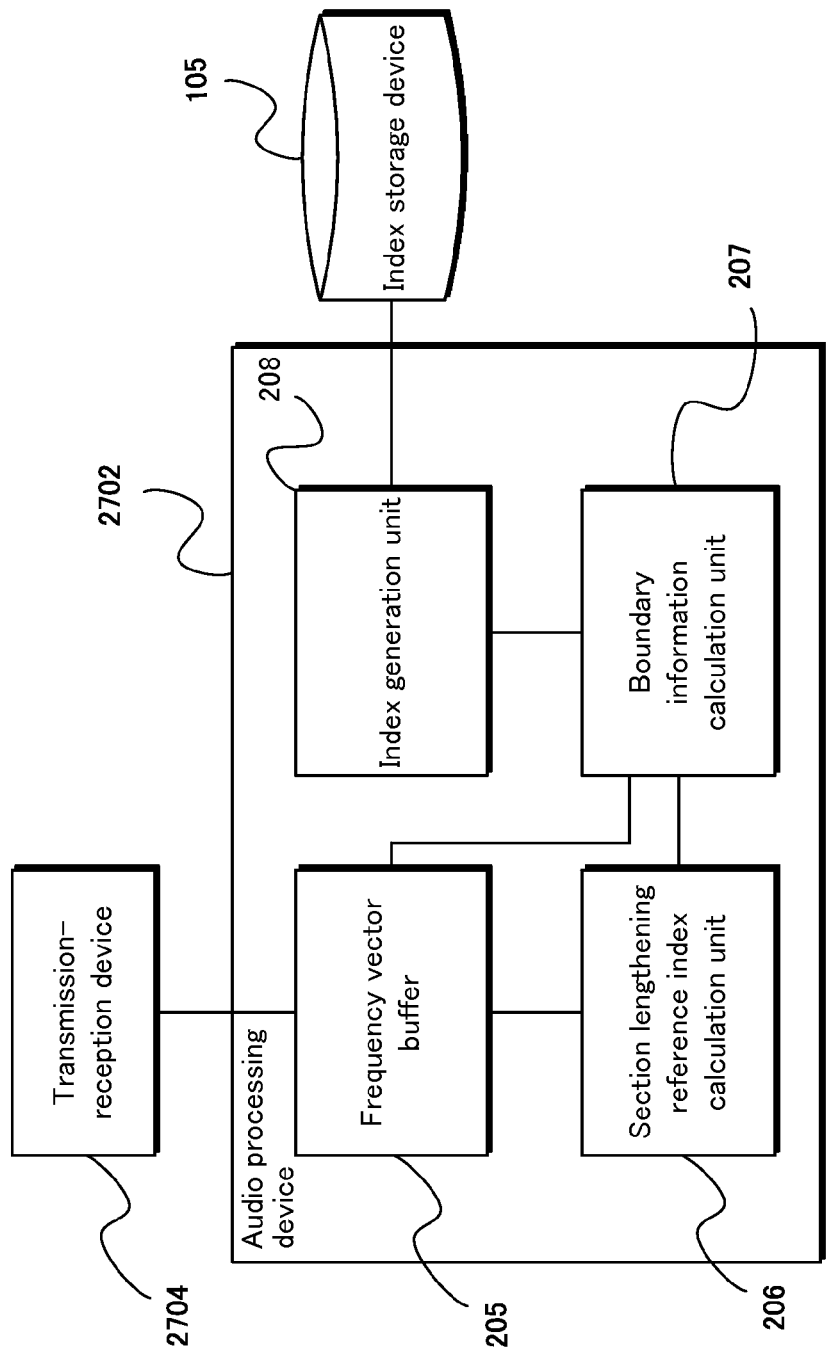
FIG. 27 is a block diagram illustrating an example of configuration of a server in the video viewing system.

FIGS. 25-27 illustrate one example of configuration of a video viewing system in which functions of the audio processing device are divided up.

As illustrated in FIG. 25, the video viewing system consists of a client 2600 and a server 2700.

The client 2600 includes a content storage device 102, an audio extraction device 103, an audio processing device 2602 and a transmission-reception device 2604.

The content storage device 102 and the audio extraction device 103 are identical to the content storage device 102 and the audio extraction device 103 in the above embodiments.

The audio processing device 2602 has a portion of the functions of the audio processing device 104 in the above embodiments. Specifically, the audio processing device 2602 has the function of generating frequency vectors from an audio signal.

The transmission-reception device 2604 has a function of transmitting the frequency vectors generated by the audio processing device 2602 to the server 2700 and a function of receiving index information from the server 2700.

The server 2700 includes an index storage device 105, an audio processing device 2702 and a transmission-reception device 2704.

The index storage device 105 is identical to the index storage device 105 in the above embodiments.

The audio processing device 2702 has a portion of the functions of the audio processing device 104 in the above embodiments. Specifically, the audio processing device 2702 has the function of generating index information from frequency vectors.

The transmission-reception device 2704 has a function of receiving the frequency vectors from the client 2600 and a function of transmitting the index information stored in the index storage device 105 to the client 2600.

FIG. 26 illustrates an example of functional configuration of the audio processing device 2602 included in the client 2600. As illustrated in FIG. 26, the audio processing device 2602 includes a feature vector generation unit 201, a likelihood vector generation unit 202, a likelihood vector buffer 203, a frequency vector generation unit 204 and an Anchor Model accumulation unit 209. Each of the above configuration elements is identical to the configuration labeled with the same reference sign in the above embodiments.

FIG. 27 illustrates an example of functional configuration of the audio processing device 2702 included in the server 2700. As illustrated in FIG. 27, the audio processing device 2702 includes a frequency vector buffer 205, a section lengthening reference index calculation unit 206, a boundary information calculation unit 207 and an index generation unit 208. Each of the above configuration elements is identical to the configuration labeled with the same reference sign in the above embodiments.

Through the above configuration, communications within the video viewing system are limited to the frequency vectors and the index information. Consequently, communication traffic volume in the video viewing system can be reduced compared to when the video file is transmitted without dividing up functions of the audio processing device.

Alternatively, the server in the video viewing system may have a function of receiving thumbnail images or the like corresponding to the index information which is generated, and subsequently transmitting both the index information which is generated and the thumbnail images which are received to another terminal connected through the network.

Through the above configuration, when a video file stored in the client is to be viewed using the other terminal connected through the network, a user of the other terminal is able to select for viewing, based on the thumbnails which are transmitted, only scenes in the video file which are of interest to the user. In other words, through the above configuration the video viewing system is able to perform streaming distribution in which only the scenes of interest to the user are extracted.

(20) Alternatively, the embodiments and modified examples described above may be partially combined with one another.

(21) Alternatively, a control program consisting of a program code written in a mechanical or high-level language, which causes a processor and circuits connected thereto in an audio processing device to execute the processing for reference index calculation, the processing for boundary information calculation and the processing for index generation described in the above embodiments, may be recorded on a recording medium or distributed through communication channels or the like. The recording medium may for example be an IC card, a hard disk, an optical disk, a floppy disk, a ROM, a flash memory or the like. The distributed control program may be provided for use stored in a memory or the like which is readable by a processor, and through execution of the control program by the processor, functions such as described in each of the above embodiments may be implemented. The processor may directly execute the control program, or may alternatively execute the control program after compiling or through an interpreter.

(22) Each of the functional configuration elements described in the above embodiments may alternatively be implemented by a circuit executing the same functions thereas or by one or more processors executing a program. Also, the audio processing device in the above embodiment may alternatively be configured as an IC, LSI or other integrated circuit package. The above package may be provided for use by incorporation in various devices, through which the various devices implement functions such as described in each of the above embodiments.

Each functional block may typically be implemented by an LSI which is an integrated circuit. Alternatively, the functional blocks may be combined in part or in whole onto a single chip. The above refers to LSI, but according to the degree of integration the above circuit integration may alternatively be referred to as IC, system LSI, super LSI, or ultra LSI. The method of circuit integration is not limited to LSI, and alternatively may be implemented by a dedicated circuit or a general processor. An FPGA (Field Programmable Gate Array), which is programmable after the LSI is manufactured, or a reconfigurable processor, which allows for reconfiguration of the connection and setting of circuit cells inside the LSI, may alternatively be used.

4. Supplementary Explanation

The following describes an audio processing device as one embodiment of the present invention, and also modified examples and effects thereof.

(A) An audio processing device, which is one embodiment of the present invention, comprises: a feature calculation unit configured to calculate, for each of a plurality of unit sections of an audio signal, section feature data expressing features of the audio signal in the unit section; a boundary calculation unit configured to calculate, for each of a plurality of target unit sections among the unit sections of the audio signal, a piece of boundary information relating to at least one boundary between a similarity section and another section of the audio signal, the similarity section consisting of a plurality of consecutive unit sections, inclusive of the target unit section, which each have similar section feature data; and a judgment unit configured to calculate a priority of each boundary that is indicated by one or more of the pieces of boundary information and judge whether the boundary is a scene change point based on the priority of the boundary.

Through the above configuration, the audio processing device detects one or more scene change points from among boundaries of each of the similarity sections, in which section feature data (feature vectors, likelihood vectors and frequency vectors) is similar. By detecting the scene change point from among the boundaries of the similarity sections, the audio processing device is able to detect a point of change in a transition scene. Also, the user is easily able to search for a desired scene change point, due to the audio processing device indexing each boundary which is selected as a scene change point from among the boundaries.

(B) In the audio processing device in section (A), the judgment unit may calculate the priority of each boundary by calculating a number of pieces of boundary information which indicate the boundary.

Through the above configuration, detection of a point of change between a scene desired by a user and another scene can be prioritized by the audio processing device, based on the assumption that for a scene desired by the user, boundaries calculated with regards to unit sections included in the scene are indicated at a same time.

(C) In the audio processing device in section (A), each of the pieces of boundary information may include a change value which indicates a degree of change of the features of the audio signal between the similarity section to which the piece of boundary information relates and the other section of the audio signal, and the judgment unit may calculate the priority of each boundary by calculating a cumulative value of change values included in pieces of boundary information which indicate the boundary.

Through the above configuration, the audio processing device can prioritize detection of a boundary of a scene in which features of the audio signal change and also of a boundary which is calculated with regards to a large number of unit sections.

(D) In the audio processing device in section (A), each of the pieces of boundary information may include a change value which indicates a degree of change of the features of the audio signal between the similarity section to which the piece of boundary information relates and the other section of the audio signal, and the judgment unit may calculate the priority of each boundary by calculating a largest value among change values included in pieces of boundary information which indicate the boundary.

Through the above configuration, the audio processing device can prioritize detection of a boundary of a scene in which features of the audio signal change.

(E) In the audio processing device in section (D), each of the pieces of boundary information may include audio environment information expressing an audio environment of the similarity section to which the piece of boundary information relates, the audio environment information being calculated using section feature data of unit sections included in the similarity section, and the audio processing device may further comprise a categorization unit configured to categorize each scene change point using the audio environment information and attach categorization information to the scene change point indicating a result of the categorization.

Through the above configuration an apparatus, such as a video display apparatus, which uses output from the audio processing device, can provide various user interface functions based on the categorization information.

(F) The audio processing device in section (A) may further comprise a threshold value calculation unit configured to calculate a threshold value based on the priorities of the boundaries, wherein the judgment unit may judge each boundary having a priority exceeding the threshold value to be a scene change point.

Through the above configuration, the audio processing device can calculate an appropriate threshold value with regards to each audio signal processed thereby. Consequently, the audio processing device can accurately detect scene change points from various different audio signals.

(G) In the audio processing device in section (A), each of the pieces of boundary information may include a start time of the similarity section to which the piece of boundary information relates.

Alternatively, in the audio processing device in section (A), each of the pieces of boundary information may include an end time of the similarity section to which the piece of boundary information relates.

Through the above configuration, when determining a similarity section with regards to each unit section, the audio processing device is only required to determine a boundary either in a forwards direction along a time axis, or in a reverse direction along a time axis. Consequently, a required amount of calculation can be reduced.

(H) In the audio processing device in section (A), each unit section may be a second unit section consisting of a plurality of first unit sections which are consecutive with one another, the audio processing device may further comprise: a model storage unit configured to store therein in advance, probability models expressing features of each of a plurality of sound pieces of various types; and a likelihood vector generation unit configured to generate a likelihood vector for each first unit section using the probability models, the likelihood vector having as components, likelihoods of each sound piece with regards to the audio signal, and the section feature data generated for each second unit section may be a frequency vector which is generated using likelihood vectors of each first unit section included in the second unit section and which indicates appearance frequencies of the sound pieces.

Through the above configuration, based on the probability models which express the sound pieces, the audio processing device is able to generate likelihood vectors and frequency vectors which express an extent to which components of the sound pieces are included in each first unit section and each second unit section of the audio signal.

(I) The audio processing device in section (H) may further comprise a feature vector generation unit configured to calculate, for each first unit section, a feature vector which indicates a frequency characteristic of the audio signal, wherein the likelihood vector generation unit may generate the likelihood vector for the first unit section using the feature vector of the first unit section and the probability models.

Through the above configuration, the audio processing device is able to detect scene change points using the frequency characteristic of the audio signal.

(J) An audio processing device, which is another embodiment of the present invention, comprises: a feature calculation unit configured to calculate, for each of a plurality of unit sections of an audio signal, section feature data expressing features of the audio signal in the unit section; a boundary calculation unit configured to calculate, for each of a plurality of target unit sections among the unit sections of the audio signal, a piece of boundary information relating to at least one boundary between a similarity section and another section of the audio signal, the similarity section consisting of a plurality of consecutive unit sections, inclusive of the target unit section, which each have similar section feature data; and a scene structure estimation unit configured to detect from among boundaries which are each indicated by one or more of the pieces of boundary information, a boundary of a scene which is one scene among one or more scenes expressed by the audio signal and a boundary of a sub-scene which is included in the scene.

The audio processing device estimates a hierarchical structure of scenes in the audio signal, thus allowing the user to easily search for a desired scene based on the hierarchical structure which is estimated.

The audio processing device and the audio processing method relating to the present invention detect one or more scene change points from an audio signal, such as from an AV content including indoor or outdoor sounds and voices. Consequently, a user can easily search for a scene which is of interest and emphasized playback (trick playback or filter processing for example) or the like can be performed for the scene which is of interest. The present invention may be used for example in an audio editing apparatus or a video editing apparatus.

REFERENCE SIGNS LIST 100 video viewing apparatus
101 input device
102 content storage device
103 audio extraction device
104 audio processing device
105 index storage device
106 output device
107 Anchor Model creation device
108 audio data accumulation device
109 interface device
201 feature vector generation unit
202 likelihood vector generation unit
203 likelihood vector buffer
204 frequency vector generation unit
205 frequency vector buffer
206 section lengthening reference index calculation unit
207, 211 boundary information calculation unit
208, 212 index generation unit
209 Anchor Model accumulation unit
301 vote tallying sub-unit
302 threshold value calculation sub-unit
303 boundary judgment sub-unit
311 boundary grading calculation sub-unit
312 audio environment categorization sub-unit
401 feature vector generation unit
402 feature vector categorization unit
403 Anchor Model generation unit

The invention claimed is:

1. An audio processing device comprising:
a non-transitory memory storing a program; and
a hardware processor configured to execute the program and cause the image recognition device to operate as the following units stored in the non-transitory memory:
a feature calculation unit configured to calculate, for each of a plurality of unit sections of an audio signal, section feature data expressing features of the audio signal in the unit section;
a boundary calculation unit configured to calculate, for each of a plurality of target unit sections among the unit sections of the audio signal, a piece of boundary information relating to at least one boundary between a similarity section and another section of the audio signal, the similarity section consisting of a plurality of consecutive unit sections, inclusive of the target unit section, which each have similar section feature data; and
a judgment unit configured to calculate a priority of each boundary that is indicated by one or more of the pieces of boundary information and judge whether the boundary is a scene change point based on the priority of the boundary,
wherein each of the pieces of boundary information includes at least one out of a start time and an end time of the similarity section to which the piece of boundary information relates, and
the similarity section includes sections having a section feature that represents a distance from a reference feature that is within a reference threshold, the reference feature being calculated using a section feature of the target unit section.

2. The audio processing device of claim 1, wherein the judgment unit calculates the priority of each boundary by calculating a number of pieces of boundary information which indicate the boundary.

3. The audio processing device of claim 1, wherein each of the pieces of boundary information includes a change value which indicates a degree of change of the features of the audio signal between the similarity section to which the piece of boundary information relates and the other section of the audio signal, and
the judgment unit calculates the priority of each boundary by calculating a cumulative value of change values included in pieces of boundary information which indicate the boundary.

4. The audio processing device of claim 1, wherein each of the pieces of boundary information includes a change value which indicates a degree of change of the features of the audio signal between the similarity section to which the piece of boundary information relates and the other section of the audio signal, and
the judgment unit calculates the priority of each boundary by calculating a largest value among change values included in pieces of boundary information which indicate the boundary.

5. The audio processing device of claim 4, wherein each of the pieces of boundary information includes audio environment information expressing an audio environment of the similarity section to which the piece of boundary information relates, the audio environment information being calculated using section feature data of unit sections included in the similarity section, and
the audio processing device further comprises
a categorization unit configured to categorize each scene change point using the audio environment information and attach categorization information to the scene change point indicating a result of the categorization.

6. The audio processing device of claim 1, further comprising
a threshold value calculation unit configured to calculate a threshold value based on the priorities of the boundaries, wherein
the judgment unit judges each boundary having a priority exceeding the threshold value to be a scene change point.

7. The audio processing device of claim 1, wherein the judgment unit judges a predetermined number of boundaries to each be a scene change point in order of highest priority thereof.

8. The audio processing device of claim 7, wherein the judgment unit determines the predetermined number in accordance with length of the audio signal.

9. The audio processing device of claim 1, wherein
the boundary calculation unit calculates a piece of boundary information for each of the unit sections of the audio signal.

10. The audio processing device of claim 1, wherein
each unit section is a second unit section consisting of a plurality of first unit sections which are consecutive with one another,
the audio processing device further comprises:
  a model storage unit configured to store therein in advance, probability models expressing features of each of a plurality of sound pieces of various types; and
  a likelihood vector generation unit configured to generate a likelihood vector for each first unit section using the probability models, the likelihood vector having as components, likelihoods of each sound piece with regards to the audio signal, and
the section feature data generated for each second unit section is a frequency vector which is generated using likelihood vectors of each first unit section included in the second unit section and which indicates appearance frequencies of the sound pieces.

11. The audio processing device in claim 10, further comprising
a feature vector generation unit configured to calculate, for each first unit section, a feature vector which indicates a frequency characteristic of the audio signal, wherein
the likelihood vector generation unit generates the likelihood vector for the first unit section using the feature vector of the first unit section and the probability models.

12. An audio processing device comprising:
a non-transitory memory storing a program; and
a hardware processor configured to execute the program and cause the image recognition device to operate as the following units stored in the non-transitory memory:
a feature calculation unit configured to calculate, for each of a plurality of unit sections of an audio signal, section feature data expressing features of the audio signal in the unit section;
a boundary calculation unit configured to calculate, for each of a plurality of target unit sections among the unit sections of the audio signal, a piece of boundary information relating to at least one boundary between a similarity section and another section of the audio signal, the similarity section consisting of a plurality of consecutive unit sections, inclusive of the target unit section, which each have similar section feature data; and
a scene structure estimation unit configured to detect from among boundaries which are each indicated by one or more of the pieces of boundary information, a boundary of a scene which is one scene among one or more scenes expressed by the audio signal and a boundary of a sub-scene which is included in the scene,
wherein each of the pieces of boundary information includes at least one out of a start time and an end time of the similarity section to which the piece of boundary information relates, and
the similarity section includes sections having a section feature that represents a distance from a reference feature that is within a reference threshold, the reference feature being calculated using a section feature of the target unit section.

13. An audio processing method for an audio processing device, the audio processing device including a non-transitory memory storing a program and a hardware processor configured to execute the program and cause the audio processing device to execute the audio processing method, the audio processing method comprising:
  a feature calculation step of calculating, for each of a plurality of unit sections of an audio signal, section feature data expressing features of the audio signal in the unit section;
  a boundary calculation step of calculating, for each of a plurality of target unit sections among the unit sections of the audio signal, a piece of boundary information relating to at least one boundary between a similarity section and another section of the audio signal, the similarity section consisting of a plurality of consecutive unit sections, inclusive of the target unit section, which each have similar section feature data; and
  a judgment step of calculating a priority of each boundary that is indicated by one or more of the pieces of boundary information and judging whether the boundary is a scene change point based on the priority of the boundary,
  wherein each of the pieces of boundary information includes at least one out of a start time and an end time of the similarity section to which the piece of boundary information relates, and
  the similarity section includes sections having a section feature that represents a distance from a reference feature that is within a reference threshold, the reference feature being calculated using a section feature of the target unit section.

14. A non-transitory computer-readable recording medium storing a program for scene change point detection in order to detect one or more scene change points in an audio signal, the program causing a computer to perform steps comprising:
  a feature calculation step of calculating, for each of a plurality of unit sections of the audio signal, section feature data expressing features of the audio signal in the unit section;
  a boundary calculation step of calculating, for each of a plurality of target unit sections among the unit sections of the audio signal, a piece of boundary information relating to at least one boundary between a similarity section and another section of the audio signal, the similarity section consisting of a plurality of consecutive unit sections, inclusive of the target unit section, which each have similar section feature data; and
  a judgment step of calculating a priority of each boundary that is indicated by one or more of the pieces of boundary information and judging whether the boundary is a scene change point based on the priority of the boundary,
  wherein each of the pieces of boundary information includes at least one out of a start time and an end time of the similarity section to which the piece of boundary information relates, and
  the similarity section includes sections having a section feature that represents a distance from a reference feature that is within a reference threshold, the reference feature being calculated using a section feature of the target unit section.

15. An integrated circuit comprising:
a non-transitory memory storing a program; and
a hardware processor configured to execute the program and cause the image recognition device to operate as the following units stored in the non-transitory memory:
a feature calculation unit configured to calculate, for each of a plurality of unit sections of an audio signal, section feature data expressing features of the audio signal in the unit section;

a boundary calculation unit configured to calculate, for each of a plurality of target unit sections among the unit sections of the audio signal, a piece of boundary information relating to at least one boundary between a similarity section and another section of the audio signal, the similarity section consisting of a plurality of consecutive unit sections, inclusive of the target unit section, which each have similar section feature data; and a judgment unit configured to calculate a priority of each boundary that is indicated by one or more of the pieces of boundary information and judge whether the boundary is a scene change point based on the priority of the boundary, wherein each of the pieces of boundary information includes at least one out of a start time and an end time of the similarity section to which the piece of boundary information relates, and the similarity section includes sections having a section feature that represents a distance from a reference feature that is within a reference threshold, the reference feature being calculated using a section feature of the target unit section.

* * * * *